(12) United States Patent
Guan et al.

(10) Patent No.: US 11,789,733 B2
(45) Date of Patent: Oct. 17, 2023

(54) INSTRUCTION PROCESSING APPARATUS, ACCELERATION UNIT, AND SERVER

(71) Applicant: Alibaba (China) Co., Ltd., Hangzhou (CN)

(72) Inventors: Yijin Guan, Beijing (CN); Fei Sun, San Jose, CA (US); Ling Liang, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 1 day.

(21) Appl. No.: 17/717,108

(22) Filed: Apr. 10, 2022

(65) Prior Publication Data

US 2022/0350598 A1 Nov. 3, 2022

(30) Foreign Application Priority Data

Apr. 21, 2021 (CN) .......................... 202110429479.0

(51) Int. Cl.
*G06F 9/30* (2018.01)
*G06F 9/38* (2018.01)
*G06F 7/544* (2006.01)
*G06F 9/48* (2006.01)

(52) U.S. Cl.
CPC .......... *G06F 9/3001* (2013.01); *G06F 7/5443* (2013.01); *G06F 9/3869* (2013.01); *G06F 9/4881* (2013.01)

(58) Field of Classification Search
CPC .... G06F 9/3001; G06F 7/5443; G06F 9/3869; G06F 9/4881
See application file for complete search history.

(56) References Cited

U.S. PATENT DOCUMENTS

| | | | | |
|---|---|---|---|---|
| 4,755,933 A | * | 7/1988 | Teshima ................ | G06F 9/3802 712/E9.055 |
| 6,947,047 B1 | * | 9/2005 | Moy ..................... | G06F 9/3838 345/506 |
| 10,832,139 B2 | | 11/2020 | Yan et al. | |
| 10,871,964 B2 | | 12/2020 | Turakhia et al. | |
| 10,936,941 B2 | | 3/2021 | Li et al. | |
| 10,970,617 B2 | | 4/2021 | Cheng et al. | |
| 11,263,007 B2 | | 3/2022 | Wan et al. | |
| 2007/0098263 A1 | * | 5/2007 | Furukawa ............ | G06V 30/387 715/201 |

(Continued)

*Primary Examiner* — Zachary K Huson

(57) ABSTRACT

An instruction processing apparatus is disclosed. The instruction processing apparatus includes: a selector is configured to parse out a command type and a buffer identifier from a command, provide received data and the buffer identifier to a parser if the command type is configuration, and provide the received data and the buffer identifier to an operation circuit if the command type is execution; the parser is configured to parse out an instruction sequence from the data, store the instruction sequence into an instruction buffer corresponding to the buffer identifier, and store an operand of each instruction into a register file; and the operation circuit is configured to drive the instruction buffer to execute each instruction and generate a control signal, and trigger a plurality of execution units to perform operations based on received control signals and operands. The apparatus may be dedicated to processing various neural network applications.

20 Claims, 17 Drawing Sheets

(56) References Cited

U.S. PATENT DOCUMENTS

| | | |
|---|---|---|
| 2010/0095091 A1* | 4/2010 | Asanaka ............... G06F 9/3836 |
| | | 712/E9.016 |
| 2018/0350351 A1 | 12/2018 | Kopys et al. |
| 2019/0114533 A1 | 4/2019 | Ng et al. |
| 2019/0286973 A1 | 9/2019 | Kovvuri et al. |
| 2020/0057934 A1 | 2/2020 | Yoo et al. |
| 2020/0250545 A1 | 8/2020 | Verrilli et al. |
| 2021/0034957 A1 | 2/2021 | Rhu et al. |
| 2021/0044303 A1 | 2/2021 | Han et al. |
| 2021/0127090 A1 | 4/2021 | Kale et al. |
| 2022/0004854 A1 | 1/2022 | Lee et al. |
| 2022/0012593 A1 | 1/2022 | Huang et al. |

\* cited by examiner

Matrix multiplication

Convolution

```
for m in range(iter_m0):
    for k in range(iter_k0):
        for n in range(iter_n0):
            m_start, m_end = m * stride_m0, (m + 1) * stride_m0
            n_start, n_end = n * stride_n0, (n + 1) * stride_n0
            k_start, k_end = k * stride_k0, (k + 1) * stride_k0 apply on PE array
            o[m_start: m_end, n_start: n_end] = i[m_start: m_end, k_start: k_end] * \
                                                w[k_start: k_end, n_start: n_end]
```

FIG. 7a

```
for m in range(iter_m0):
    for n in range(iter_n0):
        for k in range(iter_k0):
            m_start, m_end = m * stride_m0, (m + 1) * stride_m0
            n_start, n_end = n * stride_n0, (n + 1) * stride_n0
            k_start, k_end = k * stride_k0, (k + 1) * stride_k0 apply on PE array
            o[m_start: m_end, n_start: n_end] = i[m_start: m_end, k_start: k_end] * \
                                                w[k_start: k_end, n_start: n_end]
```

FIG. 7b

```
for n in range(iter_n0):
    for k in range(iter_k0):
        for m in range(iter_m0):
            m_start, m_end = m * stride_m0, (m + 1) * stride_m0
            n_start, n_end = n * stride_n0, (n + 1) * stride_n0
            k_start, k_end = k * stride_k0, (k + 1) * stride_k0 apply on PE array
            o[m_start: m_end, n_start: n_end] = i[m_start: m_end, k_start: k_end] * \
                                                w[k_start: k_end, n_start: n_end]
```

FIG. 7c

INSTRUCTION PROCESSING APPARATUS, ACCELERATION UNIT, AND SERVER

CROSS REFERENCE TO RELATED APPLICATIONS

This application claims priority to Chinese Patent Application No. 202110429479.0, filed on Apr. 21, 2021. The entire contents of the above-identified application are incorporated herein by reference.

TECHNICAL FIELD

The present disclosure relates to the field of neural networks, and in particular, to an instruction processing apparatus, an acceleration unit, and a server.

BACKGROUND

Neural networks (NNs) are one of the most popular technologies that have been emerging again in the recent decade. Neural networks have made many breakthrough advances in the fields of voice, image, big data, and biomedical science and technology, and have implemented many applications. In addition, the industry also pays more attention to execution efficiency improvement of a neural network model, which mainly includes two measures: in a software aspect, performance is improved by using algorithm optimization of the neural network model; and in a hardware aspect, performance improvement is implemented by designing various hardware acceleration units used to execute the neural network model. However, regardless of the hardware acceleration unit, how an instruction set architecture is designed is critical.

SUMMARY

An objective of the present disclosure is to provide an instruction processing apparatus and an acceleration unit, where the instruction processing apparatus uses a newly conceived instruction set architecture to be dedicated to an acceleration unit of a neural network model.

An embodiment of the present disclosure provides an instruction processing apparatus, including a plurality of instruction buffers, a register file with a plurality of entries, a selector, a parser, and an operation circuit. The register file refers to a plurality of hardware registers, and each hardware register may refer to a block of memory. The selector is configured to: receive a command and data, parse out a command type and a buffer identifier from the received command, determine whether the command type is a configuration type or an execution type, in response to the command type being the configuration type, send the received data and the buffer identifier to the parser, and in response to the command type being the execution type, send the buffer identifier to the operation circuit. The parser is configured to: parse out an instruction sequence from the received data, store the instruction sequence into one of the plurality of instruction buffers that corresponds to the buffer identifier, and store an operand of each instruction of the instruction sequence into a corresponding entry of the register file. The operation circuit is configured to: sequentially execute instructions of the instruction sequence stored in the instruction buffer corresponding to the buffer identifier, generate a control signal for each executed instruction, and send the control signal of each executed instruction and the operand of the executed instruction stored in the register file to a plurality of execution units, for each of the plurality of execution units to perform a corresponding operation based on the received control signal and the operand.

In some embodiments, the parser is further configured to: parse an original operand of each instruction of the instruction sequence; and convert the original operand into the operand for executing the instruction on each execution unit.

In some embodiments, the instruction processing apparatuses further comprises a scalar calculation unit, configured to: receive intermedia calculation results from the plurality of execution units that have executed an instruction of the instruction sequence; calculate a new operand for the instruction; and update the operand of the instruction stored in a corresponding entry in the register file with the new operand.

In some embodiments, the instruction processing apparatus supports a plurality of predefined instructions, and the instruction sequence comprises one or more of the plurality of predefined instructions.

In some embodiments, the plurality of predefined instructions comprise a data loading instruction, and each of the plurality of execution units obtains a first vector and a second vector according to a control signal of the data loading instruction, and stores the first vector and the second vector into a first queue and a first buffer, wherein the first queue is configured to store weight data of a neural network, and the first buffer is configured to store activation data of the neural network.

In some embodiments, the plurality of predefined instructions comprise a multiplication accumulation instruction, and each of the plurality of execution units obtains two values from a first queue and a first buffer according to a control signal of the multiplication accumulation instruction, so as to perform a multiplication accumulation operation, wherein the first queue is configured to store weight data of a neural network, and the first buffer is configured to store activation data of the neural network.

In some embodiments, the scalar calculation unit is further configured to: store a queue state in the corresponding entry of the register file, wherein the queue state specifies an attribute of the first queue, and the attribute of the first queue is one of the following: a first-in-first-out queue, a rotation queue, and a sliding window queue.

In some embodiments, the plurality of predefined instructions comprise a data storage instruction, and each of the plurality of execution units stores, into an external memory, an intermediate calculation result generated by the plurality of execution units according to a control signal of the data storage instruction.

In some embodiments, the plurality of predefined instructions comprise a special function instruction, and each of the plurality of execution units starts a corresponding special functional unit according to a control signal of the special function instruction.

In some embodiments, the instruction sequence corresponds to a specified neural network application, and the operation circuit uses different instruction sequences for different neural network applications.

In some embodiments, the specified neural network application is one of the following applications: matrix multiplication, convolution, and depth-wise convolution.

In some embodiments, when processing an instruction sequence of matrix multiplication, the operation circuit uses two levels of instruction pipelines: an instruction decoding level and an operand fetching level; and when processing convolution or depth-wise convolution, the operation circuit uses four levels of instruction pipelines: an instruction decoding level, an operand fetching level, a scalar processing level, and a write-back level.

According to a second aspect, a computer-implemented method. The method includes receiving, by a selector, a command and data for a neural network computation; parsing out, by the selector, a command type and a buffer identifier from the received command; determining, by the selector, whether the command type is a configuration type or an execution type; in response to the command type being the configuration type, sending, by the selector, the received data and the buffer identifier to a parser; in response to the command type being the execution type, sending, by the selector, the buffer identifier to an operation circuit; parsing out, by the parser, an instruction sequence from the received data; storing, by the parser, the instruction sequence into one of a plurality of instruction buffers that corresponds to the buffer identifier; storing, by the parser, an operand of each instruction of the instruction sequence into a corresponding entry of a register file; sequentially executing, by an operation circuit, instructions of the instruction sequence stored in the instruction buffer corresponding to the buffer identifier; generating, by the operation circuit, a control signal for each executed instruction; and sending, by the operation circuit, the control signal of each executed instruction and the operand of the executed instruction stored in the register file to a plurality of execution units, for each of the plurality of execution units to perform a corresponding operation based on the received control signal and the operand.

In some embodiments, the method may further include parsing, by the parser, an original operand of each instruction of the instruction sequence; and converting, by the parser, the original operand into the operand for executing the instruction on each execution unit.

In some embodiments, the method may further include receiving, by the operation circuit, intermedia calculation results from the plurality of execution units that have executed an instruction of the instruction sequence; calculating, by the operation circuit, a new operand for the instruction; and updating, by the operation circuit, the operand of the instruction stored in a corresponding entry in the register file with the new operand.

In some embodiments, the instruction sequence comprises one or more of a plurality of predefined instructions.

In some embodiments, the instruction sequence comprises a data loading instruction, and the method further comprises: obtaining, by each of the plurality of execution units, a first vector and a second vector according to a control signal of the data loading instruction, and storing, by each of the plurality of execution units, the first vector and the second vector into a first queue and a first buffer, wherein the first queue is configured to store weight data of a neural network, and the first buffer is configured to store activation data of the neural network.

In some embodiments, the instruction sequence comprises a multiplication accumulation instruction, and the method further comprises: obtaining, by each of the plurality of execution units, two values from a first queue and a first buffer according to a control signal of the multiplication accumulation instruction to perform a multiplication accumulation operation, wherein the first queue is configured to store weight data of a neural network, and the first buffer is configured to store activation data of the neural network.

In some embodiments, the instruction sequence corresponds to a specified neural network application, and the operation circuit uses different instruction sequences for different neural network applications.

In some embodiments, each of the plurality of execution units a plurality of processing entities comprises: a weight queue configured to store weight data of a neural network; an input buffer configured to store activation data of the neural network; a load queue configured to store to-be-executed computation payloads based on the weight data from the weight queue and the activation data from the input buffer; a load balancer coupled to the load queue of the processing entity and a load queue of a neighboring processing entity, and the method further comprising: detecting, by the load balancer, a load imbalance between the load queue of the processing entity and load queue of the neighboring processing entity; and if the load queue of the processing entity has a heavier load, fetching, by the load balancer, a payload from the load queue of the processing entity and send the payload to the load queue of the neighboring processing entity for processing.

The instruction processing apparatus provided in the embodiments of the present disclosure is essentially an instruction set architecture used to process a neural network application, and may be used to construct acceleration units of various neural network models, so as to improve a hardware acceleration capability of the neural network model.

BRIEF DESCRIPTION OF THE DRAWINGS

The foregoing and other objectives, features, and advantages of the present disclosure are becoming more obvious through the descriptions of the embodiments of the present disclosure with reference to the following accompanying drawings.

FIG. 7a to FIG. 7c illustrate three segments of pseudo code in accordance with some embodiments.

DETAILED DESCRIPTION

Figure 1:
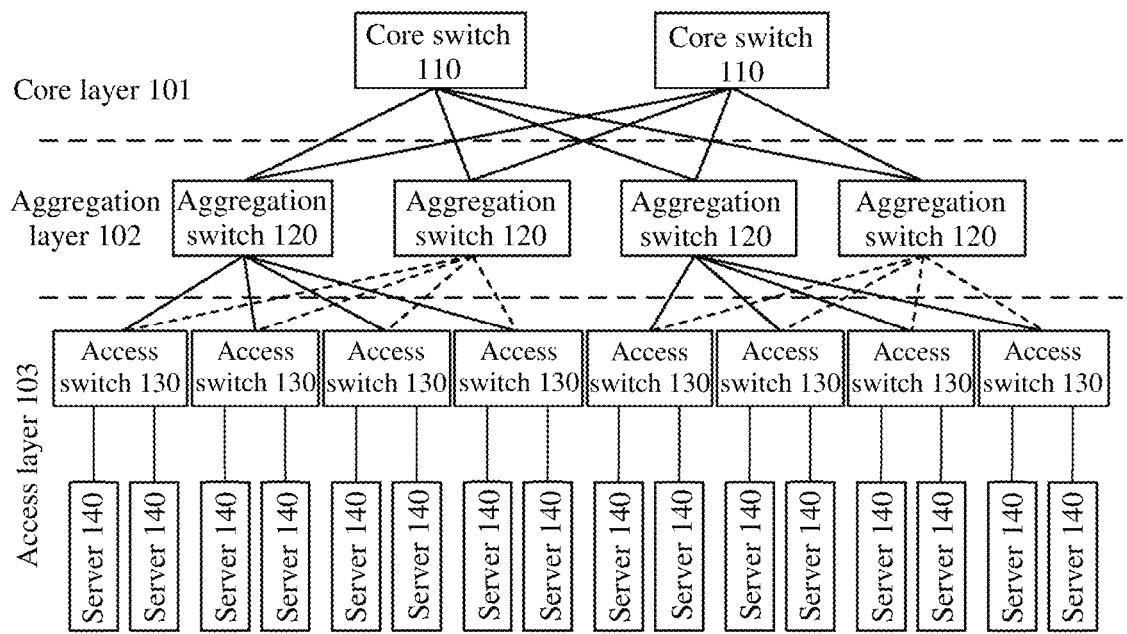
FIG. 1 illustrates a hierarchical structure diagram of a data center in accordance with some embodiments.

The following describes the present disclosure based on the embodiments, but the present disclosure is not merely limited to the embodiments. Some specified details are described in the following detailed descriptions of the present disclosure. A person skilled in the art may also fully understand the present disclosure without the descriptions of the details. To prevent the essence of the present disclosure from being confused, well-known methods, procedures, and processes are not described in detail. In addition, the accompanying drawings are not necessarily drawn to scale.

The following terms are used herein.

Acceleration unit or hardware accelerator: For cases where general purpose processors are inefficient in fields of special use (for example, processing images, processing neural network operations, etc.), acceleration units are processing units or hardware devices designed to increase data processing speeds in these fields of special use. The acceleration units are often used in conjunction with the general purpose processors CPUs, accept control of the general purpose processors, perform processing in specific use or fields, and improve computer processing efficiency in specific use or fields. Acceleration units may also be referred to as AI processing units, and may include a graphics processing unit (GPU), a central processing unit (CPU), an application specific integrated circuit (ASIC), a field programmable gate array (FPGA), an application specific integrated circuit (ASIC), and dedicated AI acceleration hardware (such as an acceleration unit).

On-chip memory: it refers to a memory that is used separately in a primary core or a secondary core and cannot be shared.

Command processor: it refers to a command interface between an acceleration unit and a central processing unit that drives the acceleration unit to work. The command processor receives instructions the central processing unit requests the acceleration unit to execute, and divides the instructions into components in the acceleration unit to execute. In addition, the command processor is further responsible for synchronization of the components in the acceleration unit.

Lifecycle: an operand is not always involved in all processes of an instruction sequence, and lifecycle refers to a part between the first occurrence of the operand and the last time the operand is used in the instruction sequence is a lifecycle of the operand. That is, after the lifecycle expires, the operand is no longer used, and does not need to stay in an on-chip memory.

Neural network: it generally refers to an artificial neural network (ANN), and is an algorithm network that imitates a behavior feature of an animal neural network and performs distributed parallel information processing. A classical neural network is also the simplest neural network structure, and includes three layers: an input layer, an output layer, and an intermediate layer (also referred to as a hidden layer). The input layer, the output layer, and the intermediate layer each include a plurality of nodes.

Neural network model: in a neural network, nodes are mathematically represented, and mathematical models of the nodes are generated. Mathematical models of a large quantity of nodes in the neural network form a neural network model.

Deep learning model: the concept of deep learning is derived from the study of neural networks. A neural network that contains a plurality of intermediate layers is referred to as a deep learning network. Therefore, in this sense, the deep learning model is also a neural network model. Both the deep learning model and the neural network model need to be generated through training. Sample data is input into a designed network structure, feature information is extracted by using a plurality of intermediate layers, and weight data of each node is constantly corrected based on an output result of an output layer, so that the output result of the output layer gradually approximates a preset result, until final weight data is determined. The trained deep learning model may be truly applied to an actual scenario, and use of the deep learning model in the actual scenario may be collected, to optimize in turn the deep learning model.

Node: it refers to a minimum unit of an independent operation in a deep learning model, receives an input, and generates an output after an operation using a weight parameter of the node or a parameter (for example, a hyperparameter) in another model. The deep learning model may include various specific operations such as convolution and pooling, and further includes various operation nodes such as a convolution node and a pooling node. The deep learning model has a plurality of layers, each layer has a plurality of nodes, and an output of each node is an input to a node of a next layer. Further, the node includes a program for a specific operation and related data. For example, the convolution operation node includes program code used for the convolution operation and some data used for convolution.

Operator: it refers to a set of operations constructed in a deep learning model to implement a specific function. Each layer of the deep learning model may include a plurality of such operators. The operator may be referred to as an operation in the TensorFlow framework and a layer in the Caffe framework. The operator is considered as a further implementation based on a node, and one operator may correspond to one or more nodes. Therefore, programs and data corresponding to the operator and the node are sometimes the same.

Instruction set (instruction set architecture): it refers to a set of instructions that are supported by a chip to perform an operation, for example, an operation that mainly supports a deep learning operator, for example, Convolution, Pooling, ROI, etc.

Data Center

FIG. 1 illustrates a hierarchical structure diagram of a data center of a scenario to which an embodiment of the present disclosure is applied.

A data center is a globally collaborative specific device network, and is used to transfer, accelerate, display, calculate, and store data information in a network infrastructure of the Internet. Data center are assets for enterprise competition. As data center applications are widespread, artificial intelligence and the like are increasingly applied to data centers. As an important technology of artificial intelligence, neural networks have been widely applied to big data analysis operations of data centers.

In a conventional large data center, a network structure is generally a three-layer structure shown in FIG. 1, that is, a hierarchical inter-networking model. This model includes the following three layers:

An access layer 103 is sometimes referred to as an edge layer, and includes an access switch 130 and servers 140 connected to the access switch. Each server 140 is a processing and storage entity of a data center, and a large quantity of data in the data center is processed and stored by these servers 140. The access switch 130 is configured to allow these servers to access switches in the data center. One access switch 130 accesses a plurality of servers 140. Access switches 130 are usually located at the top of the rack, are also referred to as top of rack switches, and are physically connect to servers.

An aggregation layer 102 is sometimes referred to as a distribution layer and includes an aggregation switch 120. Each aggregation switch 120 is connected to a plurality of access switches and provides other services such as firewall, intrusion detection, and network analysis at the same time.

A core layer 101 includes a core switch 110. The core switch 110 provides high-speed forwarding for packets entering and exiting the data center, and provides connectivity for a plurality of aggregation layers. Networks of the entire data center are divided into an L3 routing network and an L2 routing network. The core switch 110 provides an elastic L3 routing network for the networks of the entire data center.

Generally, the aggregation switch 120 is a demarcation point of the L2 and L3 routing networks, the L2 network is the part below the aggregation switch 120, and the L3 network is the part above the aggregation switch 120. Each group of aggregation switches manages one point of delivery (POD). Each POD has an independent VLAN network therein. The server does not need to modify an IP address and a default gateway when being migrated within the POD because one POD corresponds to one L2 broadcast domain.

A spanning tree protocol (STP) is usually used between the switch 120 and the access switch 130. STP makes one aggregation switch 120 available for one VLAN network, and other aggregation switches 120 are used in the event of a failure (the dashed line in the figure above). That is, there is no horizontal extension at the aggregation layer, because even if a plurality of aggregation switches 120 are added, only one aggregation switch is working at a given point of time.

Figure 2:
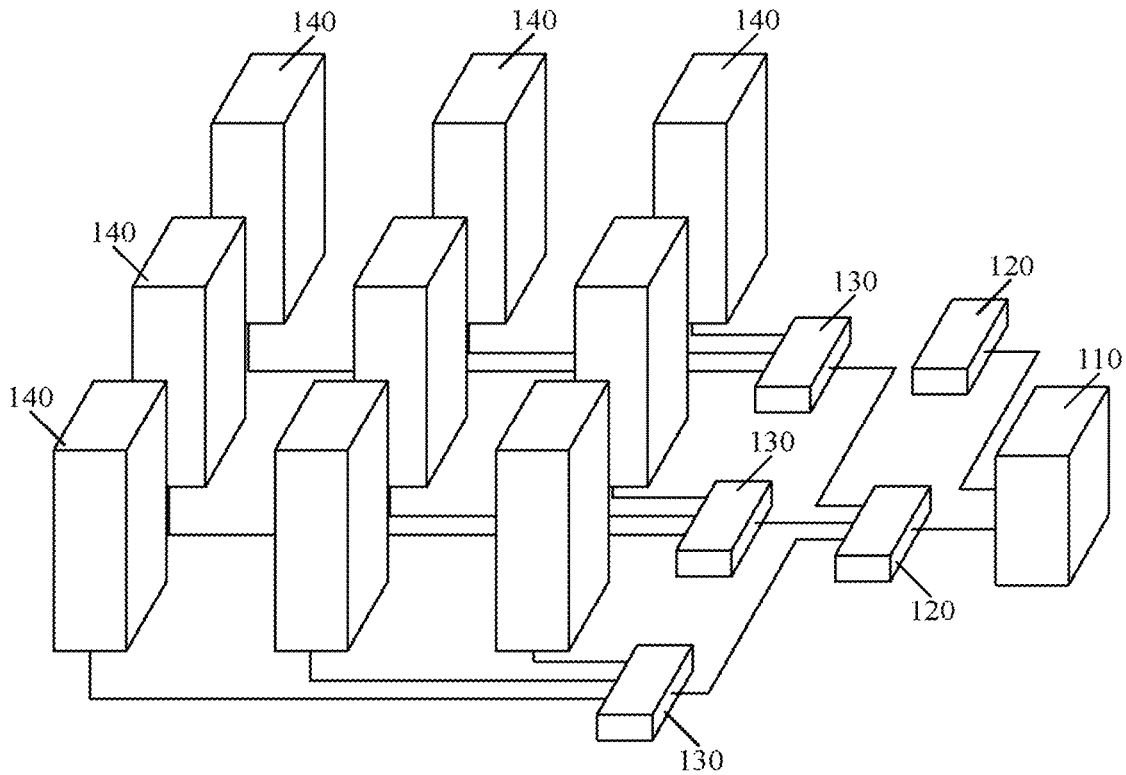
FIG. 2 illustrates a 3D structural diagram of a data center in accordance with some embodiments.

FIG. 2 illustrates physical connections of components in the hierarchical data center of FIG. 1. As shown in FIG. 2, one core switch 110 is connected to a plurality of aggregation switches 120, one aggregation switch 120 is connected to a plurality of access switches 130, and one access switch 130 accesses a plurality of servers 140.

Cloud Server

Figure 3:
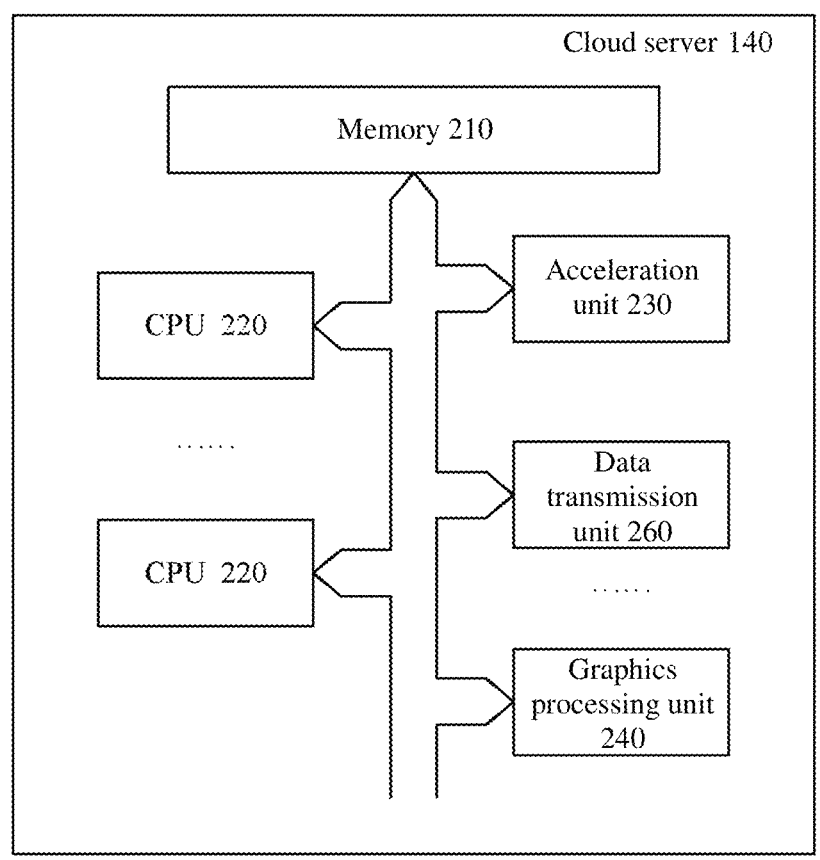
FIG. 3 illustrates a schematic structural diagram of a common structure cloud server in a data center in accordance with some embodiments.

A cloud server 140 is a hardware device of the data center. Because the cloud server 140 operates at a high speed to perform various tasks such as matrix calculation, image processing, machine learning, compression, and search sorting, the cloud server 140 generally includes a central processing unit (CPU) and various acceleration units, as shown in FIG. 3, to efficiently complete the foregoing tasks. The acceleration unit is, for example, one of an acceleration unit dedicated to a neural network, a data transmission unit (DTU), a graphics processing unit (GPU), an application specific integrated circuit (ASIC), and a field programmable gate array (FPGA). An exemplary acceleration unit is described below, as shown in FIG. 3.

A data transmission unit (DTU) 260 is a wireless terminal device specially configured to convert serial port data into IP data or convert IP data into serial port data for transmission by using a wireless communications network. The main function of the DTU is to send data of a remote device back to a background center wirelessly. At a frontend, the DTU is connected to a device of a customer through an interface. After the DTU is powered on and operates, the DTU registers with a mobile GPRS network, and then establishes a socket connection to a background center in the DTU. The background center serves as a server device of the socket connection, and the DTU is the client of the socket connection. Therefore, the DTU is used together with background software. After the connection is established, the device at the frontend and the center at the background can perform wireless data transmission through the DTU.

A graphics processing unit (GPU) 240 is a processor that specially performs image and graph-related working. Using the GPU overcomes a disadvantage of too small space in a calculation unit in a CPU, and when a large quantity of calculation units dedicated to graphics calculation are used, for a graphics card to reduce dependence on the CPU and undertake some calculation-intensive image processing work originally undertaken by the CPU.

An application specific integrated circuit (ASIC) is an integrated circuit designed and manufactured to meet specific user requirements and a specific electronic system. Because this type of integrated circuit is customized according to user requirements, a structure of the integrated circuit often corresponds to specific user requirements.

A field programmable gate array (FPGA): is a product developed on the basis of programmable devices such as PAL and GAL. As a semi-customized circuit in the field of application specific integrated circuit (ASIC), the field programmable gate array not only solves the shortage of customized circuits, but also overcomes the disadvantage of a limited quantity of gate circuits of original programmable devices.

An acceleration unit 230 for a neural network model is a processing unit that uses a data-driven parallel calculation architecture and is configured to process a large quantity of operations (such as convolution and pooling) of each neural network node. Because data in a large quantity of operations (such as convolution and pooling) of each neural network node is closely associated with an intermediate result in an entire calculation process, the acceleration unit is frequently used. When an existing CPU architecture is used, because a memory capacity in a CPU core is very small, a large quantity of out-of-core memory needs to be frequently accessed (e.g., frequent external memory accesses), thereby causing low processing efficiency. When the acceleration unit is used, because the acceleration unit has an on-chip memory that provides a storage capacity for neural network calculation, frequent access to the out-of-core memory is avoided or reduced, thereby greatly improving processing efficiency and calculation performance.

Although execution efficiency of the acceleration unit 230 is much higher than that of a common processor for a specific application or field, the acceleration unit 230 also needs to be controlled by a processing unit 220. In the following description, an acceleration unit dedicated to a deep learning model is used as an example. A memory 210 stores various deep learning models, including neurons of these models, weight data of the neurons, and the like. These deep learning models are deployed to one acceleration unit 230 by one processing unit 220 in FIG. 3 when required. For example, the processing unit 220 may notify, in an instruction form, the acceleration unit 230 of a storage/memory location of the deep learning model of the acceleration unit 230 in the memory 210. The acceleration unit 230 may then perform addressing according to these memory locations, and store a to-be-executed instruction in an on-chip memory of the acceleration unit 230. The processing unit 220 may alternatively send a to-be-executed instruction of the acceleration unit 230 to the acceleration unit 230 in an instruction form, and the acceleration unit 230 receives the instruction and stores the instruction in the on-chip memory. The acceleration unit 230 may further obtain input data in the foregoing manner Once the acceleration unit 230 obtains the to-be-executed instruction and the input data, inference calculation is performed. Weight data of a node may be included in an instruction sequence of the deep learning model, and taken out from the memory 210 together by the acceleration unit 230. Certainly, the weight data of the node may alternatively be independently stored, and the acceleration unit 230 extracts the weight data from the memory 210 when required. The processing unit 220 is a hardware unit that has a scheduling and control capability, and is generally a hardware unit such as a central processing unit (CPU), a microcontroller, and a microprocessor.

Acceleration Unit in an Embodiment of the Present Disclosure

Figure 4:
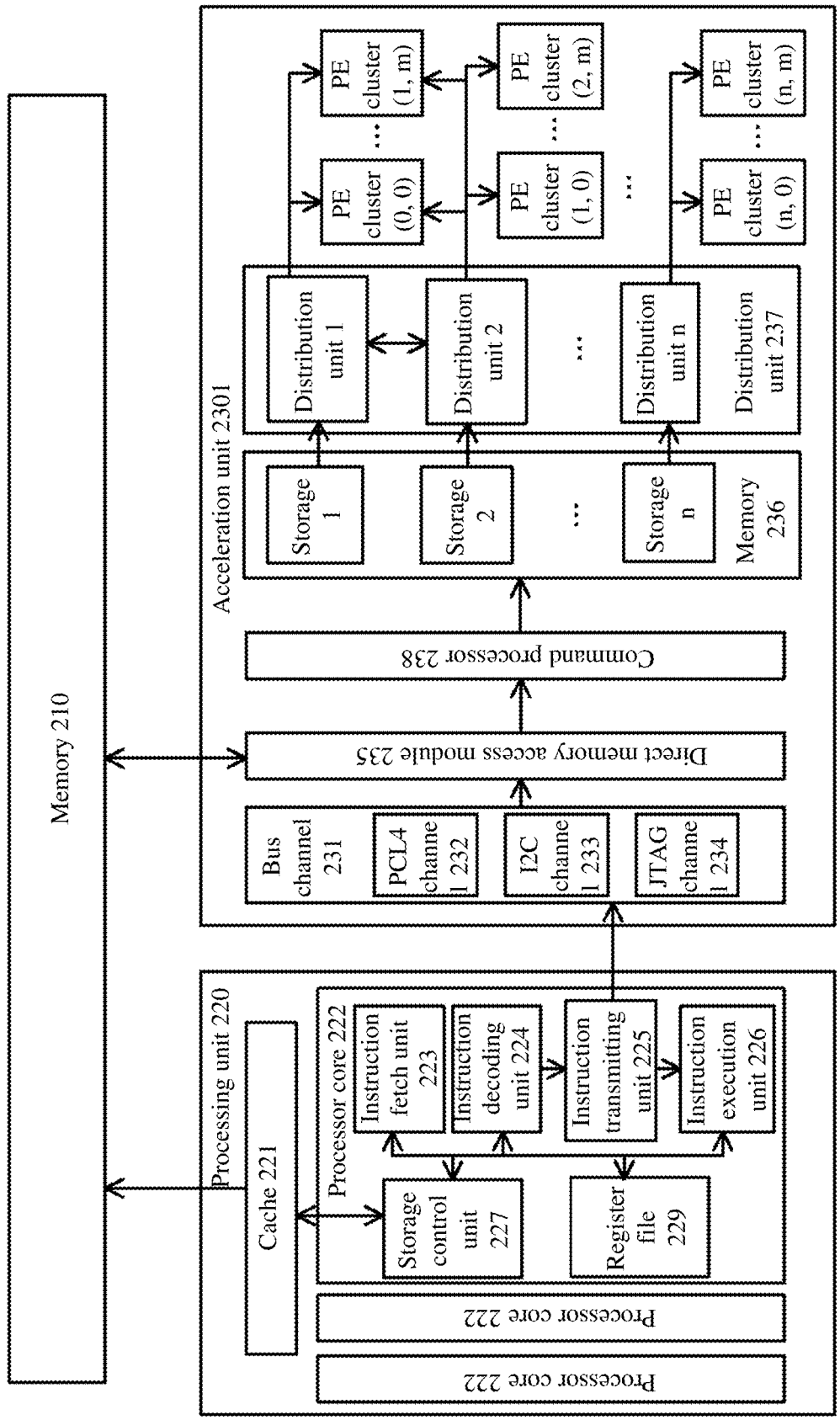
FIG. 4 illustrates a more specific schematic structural diagram of the cloud server in FIG. 3 in accordance with some embodiments.

With reference to FIG. 4, the following describes an internal structure of each of the processing unit 220 and an acceleration unit 2301 provided in this embodiment of the present disclosure, and how the processing unit 220 controls the acceleration unit 2301 to work.

As shown in FIG. 4, the processing unit 220 includes a plurality of processor cores 222 and a cache 221 shared by the plurality of processor cores 222. Each processor core 222 includes an instruction fetch unit 203, an instruction decoding unit 224, an instruction transmitting unit 225, and an instruction execution unit 226.

The instruction fetch unit 223 is configured to: transfer a to-be-executed instruction from a memory 210 to an instruction register (which may be a register used to store an instruction in a register file 229 shown in FIG. 4), receive a next instruction fetch address or obtain a next instruction fetch address by means of calculation according to an instruction fetch algorithm, where the instruction fetch algorithm includes, for example, increasing or decreasing an address according to an instruction length.

After an instruction is fetched, the processing unit 220 enters an instruction decoding phase, and the instruction decoding unit 224 decodes the fetched instruction according to a predetermined instruction format, so as to obtain an operand obtaining information required by the fetched instruction, so as to prepare for an operation of the instruction execution unit 225. The operand obtaining information refers to, for example, an immediate, a register, or other software/hardware that can provide a source operand.

The instruction transmitting unit 225 is located between the instruction decoding unit 224 and the instruction execution unit 226, and is configured to schedule and control an instruction, so as to efficiently allocate instructions to different instruction execution units 226 for parallel processing.

After the instruction transmitting unit 225 transmits the instruction to the instruction execution unit 226, the instruction execution unit 226 starts to execute the instruction. However, if the instruction execution unit 226 determines that the instruction should be executed by an acceleration unit, the instruction execution unit 226 forwards the instruction to a corresponding acceleration unit for execution. For example, if the instruction is a neural network inference instruction, the instruction execution unit 226 does not execute the instruction, but sends the instruction to the acceleration unit 230 by using a bus, and the acceleration unit 2301 executes the instruction.

The acceleration unit 2301 includes a bus channel 231, a direct memory access module 235, an on-chip memory 236, a distribution unit 237, a command processor 238, and a PE array.

The bus channel 231 is a channel for an instruction to enter and exit the acceleration unit 230 from the bus. According to different mechanisms, the bus channel 231 may include a Peripheral Component Interconnect Express (PCIE) channel 232, an I2C channel 233 (alternatively known as IIC, it is a synchronous, multi-controller/multi-target, packet switched, single-ended, serial communication bus), a JTAG channel 234 (JTAG is an industry standard for verifying designs and testing printed circuit boards after manufacture), another suitable channel, or any combination thereof. PCIE, that is, PCI-Express, is a high-speed serial computer extended bus standard, and was proposed in 2001 to replace the old PCI, PCI-X, and AGP bus standards. PCIE supports high-speed serial point-to-point dual-channel high-bandwidth transmission. Connected devices are allocated an exclusive channel bandwidth and do not share a bus bandwidth. PCIE supports functions of active power management, error reporting, end-to-end reliability transmission, hot swap, and quality of service. A main advantage of PCIE is a high data transmission rate, and PCIE also has great development potential. Currently, most PCIE buses are PCIE GEN3. However, in this embodiment of the present disclosure, PCIE GEN4 may also be used, i.e., a bus channel that follows the PCI-Express 4.0 standard. The I2C channel 233 is a simple, two-way two-line synchronous serial bus channel. The I2C channel 233 only needs two lines to transmit information between components connected to a bus. JTAG is short for the Joint Test Action Group and is a common name of IEEE standard 1149.1, Standard Test Access Port and Boundary-Scan Architecture. This standard is used to verify, design, and test functions of manufactured printed circuit boards. In 1990, JTAG was formally standardized by IEEE document 1149.1-1990. In 1994, additional documents were added to describe the boundary scan description language (BSDL). Since then, this standard has been widely adopted by electronic enterprises worldwide. Boundary scan is almost synonymous with JTAG. The JTAG channel 234 is a bus channel that complies with this standard.

The direct memory access (DMA) module 235 is a function provided by some computer bus architectures, and can enable data to be directly written from an additional device (for example, an external memory) to the on-chip memory 236 of the acceleration unit 2301. This manner greatly improves data access efficiency of the acceleration unit 2301 compared with obtaining data by using the processing unit 220. Because of such a mechanism, the acceleration unit 230 may directly access the memory 210 to read a weight of a deep learning model and activation data, thereby greatly improving data access efficiency. Although the figure shows that the direct memory access module 235 is located between the processor 238 and the bus channel 231, the design of the acceleration unit 2301 is not limited thereto. In addition, in some hardware designs, each PE unit may include a direct memory access module 235 to directly read data from an additional device and write the data to the on-chip memory 236.

In the neural network model, neural network applications such as matrix operations, convolution, and depth-wise convolution involve a large quantity of input data, and generally all input data cannot be imported into the acceleration unit 2301 at a time (e.g., due to limited memory space). Therefore, a practice of the acceleration unit 2301 in the embodiments of the present disclosure is as follows: if it is determined that the neural network operation cannot be completed once (e.g., in a single iteration), the command processor 238 divides the to-be-executed neural network application into a plurality of to-be-executed sub-operations, converts the sub-operations into an instruction sequence (a plurality of to-be-executed instructions) executed on PE clusters of a plurality of PE cluster groups, loads, by using the direct memory access module 235 for a plurality of times, operation data required by each sub-operation, specifies operation data of each instruction sequence, and finally stores, into a corresponding storage unit, an instruction sequence and operation data that are respectively corresponding to a plurality of homogeneous PE clusters included in each PE cluster group. In some embodiments, the operation data of the sub-operation may be evenly allocated to each instruction sequence.

It should be noted that a result generated by each sub-operation is an intermediate result. Therefore, intermediate results of a plurality of sub-operations need to be integrated into a final result. Because the intermediate results are generated in the PE cluster, and storage space on the PE cluster is limited, the intermediate results cannot be stored indefinitely. Therefore, the instruction sequence needs to export back the intermediate result from the PE cluster to a corresponding storage unit or export the intermediate result to the memory 210 by using a corresponding storage unit. In an integration step after all or a portion of sub-operations are completed, there may be a plurality of integration manners, for example, intermediate results of a plurality of PE clusters (PE clusters in the same row in FIG. 4) coupled to the same distribution unit may be integrated, and then intermediate results of a plurality of PE cluster groups are integrated.

As shown in the figure, the command processor 238 is coupled to the memory 236, and the memory 236 is divided into a plurality of storage units. The plurality of storage units are respectively and correspondingly coupled to a plurality of distribution units one-to-one, and each distribution unit is respectively coupled to a PE cluster group formed by a plurality of PE clusters. Each distribution unit obtains, from a storage unit coupled to the distribution unit, an instruction sequence that may be executed on the PE cluster and operation data, and distributes the instruction sequence and the operation data to the PE cluster coupled to the distribution unit. It should be noted that a quantity of PE clusters included in each PE cluster group is the same herein, and a function and a hardware structure of each PE cluster are the same. In some embodiments, the instruction sequence and the operation data of the PE cluster may be sent to the PE cluster for performing a first sub-operation, and in the subsequent sub-operations, only the new operation data is sent to the PE cluster. The instruction sequence will stay in the PE cluster and be reused for the subsequent sub-operations In the figure, as an example, there are n storage units and n distribution units, and n rows and m columns of PE clusters. Each distribution unit is coupled to one row of PE clusters by using a first bus. If one row of PE clusters needs to obtain the same data, the distribution unit broadcasts the data to the one row of PE clusters by using the first bus. Otherwise, the distribution unit is only responsible for sending, by using the first bus, the instruction sequence and the operation data to each PE cluster coupled to the distribution unit. As shown in the figure, each PE cluster further includes k PE units having the same function. Therefore, a three-dimensional PE array with dimensions of n*m*k is formed, where m, n, and k are integers greater than 1. Certainly, based on a same inventive concept, a two-dimensional or more-dimensional PE array may be further designed.

Figure 5A:
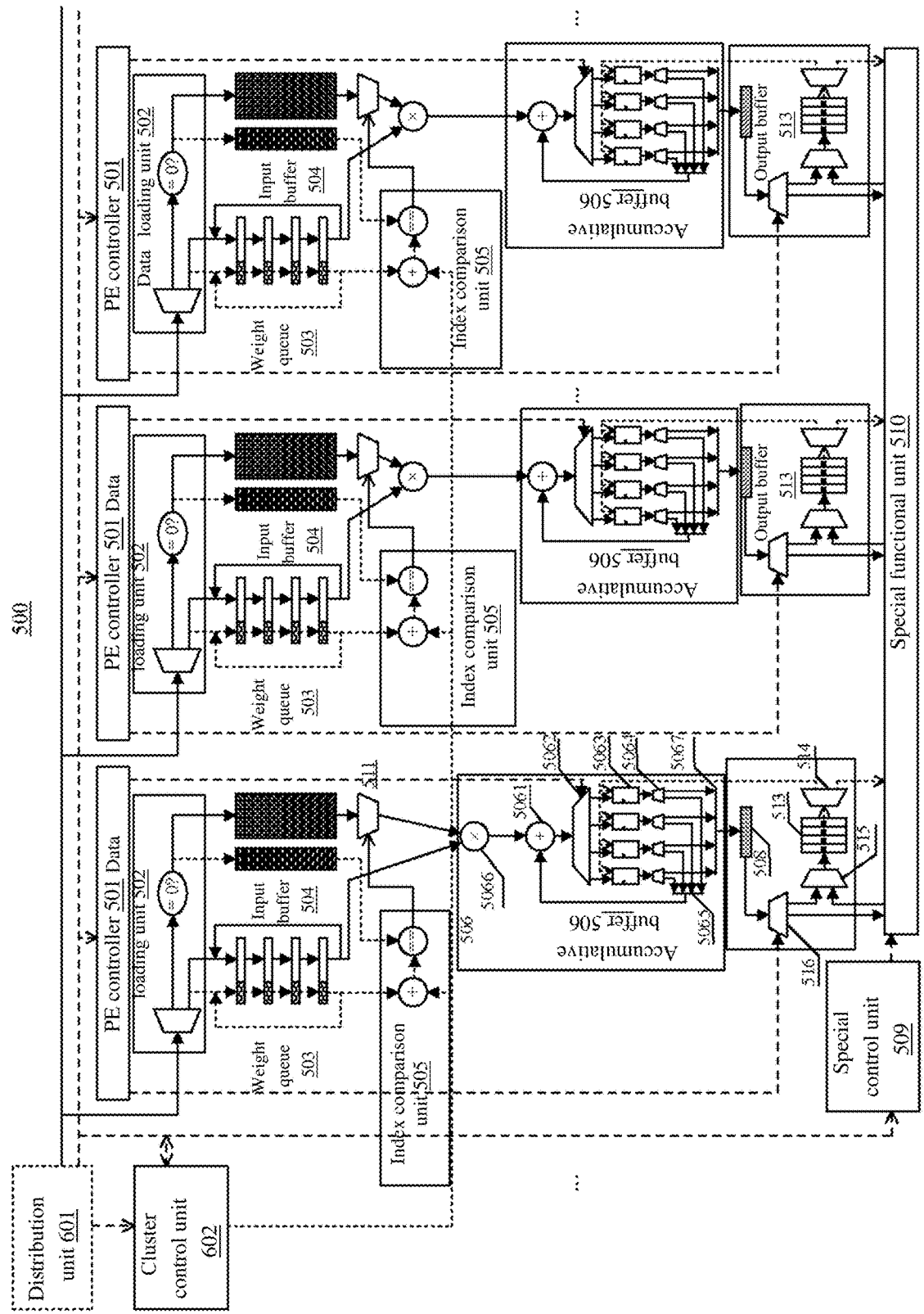
FIG. 5a illustrates a design diagram of an example PE cluster in accordance with some embodiments.

FIG. 5a is a design diagram of an example PE cluster. As shown in the figure, a PE cluster 500 includes a cluster control unit 602 and a plurality of PE units that are coupled to the cluster control unit 602 and that are homogeneous (e.g., capable of performing the same function). The cluster control unit 602 receives an instruction sequence, where the instruction sequence includes a data loading instruction. The cluster control unit 602 controls each PE unit to execute the same instruction sequence, and may load different operation data from different data addresses when controlling a data loading instruction in an instruction sequence by using a control signal generated by the cluster control unit 602, for different PE units to obtain different intermediate results based on different operation data.

A PE controller 501 is included in each PE unit. Each PE unit further includes a data loading unit 502, a weight queue 503, an input buffer 504, an index comparison unit 505, a selector 511, a multiplication accumulator 506, a buffer 508, an output queue 513, selectors 514-516, a special control unit 509, and a special functional unit 510.

The data loading unit 502 is responsible for receiving input data from a distribution unit 601, and store the input data into the weight queue 503 or the input buffer 504 according to a data type of the input data. The data type of the input data includes weight data and activation data, the weight data is stored in the weight queue 503, and the activation data is stored in the input buffer 504. In addition, the data loading unit 502 generates a bit mask of the activation data by checking whether each value of the activation data (that is, checking each item of a matrix) is equal to 0. Therefore, the bit mask of the activation data is used to indicate whether each value of the activation data is 0. For example, when each value of the activation data is 0, the bit mask is set to 0.

In some embodiments, when compiling and deploying a sparse neural network model, the processing unit 220 organizes and stores weight data in the neural network model in a form of "non-zero value+weight index". Therefore, when the weight data enters a PE cluster by using a distribution unit 601, the weight data loaded into a weight queue 503 is a weight index and a non-zero value corresponding to the weight index (in the weight queue 503 in the figure, the weight index and the non-zero value corresponding to the weight index are marked with different patterns). In some other embodiments, before the weight data enters the weight queue 503, the distribution unit 601 and the command processor 238 complete organizing and storing the weight data in the form of "non-zero value+weight index". These two implementations are particularly applicable to a sparse neural network model.

As shown in the figure, in order to implement streaming storage of the weight data, the weight queue 503 is designed using a queue-like architecture. A storage unit constituting the weight queue 503 may be a shift register, and may form a loopback path (loopback path) to support multiplexing of the weight data during a convolution operation. The loopback path refers to a head-to-tail connected queue. When a write and/or read operation reaches the tail of the queue, a next write and/or read operation returns to the head of the queue.

The input buffer 504 stores the activation data and the bit mask generated according to the activation data. Although not shown, the activation data herein should include an activation index and an activation value corresponding to the activation index, plus the bit mask. The input buffer 504 stores the activation index, the activation value corresponding to the activation index, and the bit mask corresponding to the activation index The index comparison unit 505 is responsible for generating a payload, where the payload is a matrix operation based on a non-zero weight and the activation data. The index comparison unit 505 includes a summator and a comparator. The summator is configured to add the weight index and a base address (the weight index is received from the weight queue 503, and the base address is obtained from the cluster control unit 602) to obtain an input index. The comparator receives the input index of the summator, compares the input index with an index value output by the output buffer 504, and generates and provides a control signal to a control end of the selector 511 if the input index is the same as the index value and a corresponding value indicated by the bit mask is not 0, for the input buffer 504 to output a value corresponding to the input index and provide the value to the multiplication accumulator 506. The multiplication accumulator 506 is configured to perform a multiplication accumulation operation. The multiplication accumulator 506 stops the accumulation operation of the multiplication accumulator according to a control signal of the PE controller 501, and outputs an accumulation result to the buffer.

As shown in the figure, in an optional embodiment, the accumulative buffer 506 includes a multiplier 5066, a summator 5061, a selector 5067, a plurality of buffers 5063, a plurality of selectors 5064, a selector 5065, and a selector 5067. An output end of the multiplier 5066 is coupled to an input end of the summator 5061. An output end of the summator 5061 is coupled to an input end of the selector 5067, a plurality of output ends of the selector 5067 are respectively coupled to a plurality of buffers 5063, the plurality of buffers 5063 are coupled to input ends of the plurality of selectors 5064, and two output ends of each selector 5064 are respectively coupled to input ends of the selector 5065 and the selector 5067. An output end of the selector 5065 is coupled to the input end of the summator 5061. An output end of the selector 5067 is coupled to the external buffer 508.

In the accumulative buffer 506, a product generated by the multiplier 5066 is accumulated by the summator 5061. The accumulation result is input to the selector 5062 to decide to store the accumulation result into one of four buffers 5063 according to the control signal from the PE controller 501. The plurality of buffers 5063 are four homogeneous buffers on the figure. The accumulation result stored in the buffer 5063 is transmitted to different submodules, depending on the operation. As shown in the figure, by using the selectors 5064 and 5065, the accumulation result may be transmitted to the summator 5061 to continue the accumulation operation, and the accumulation result is also stored into the output queue 513 by using the buffer 508 and selectors 515 and 516. The output queue 513 may store accumulation results of a plurality of operations, and these intermediate results may be transferred to the memory 236 by using the distribution unit 601, and may further be transferred to the external memory 210. The accumulation result may also be stored in the output queue 513 as an intermediate result for a long time and provided to the four buffers 5063 in due time to summate a plurality of accumulation results again. The accumulation result may also be provided to the special functional unit 510 by using the selector 516. The accumulation result in the output queue 513 may alternatively be provided to the special functional unit 510 by using the selector 514.

The special functional unit (SFU) 510 is configured to perform all special functions (such as an activation function or reduction) required by the neural network model. The special functional unit (SFU) 510 may be coupled to a plurality of parallel PE units by using a message queue/FIFO interface. The special functional unit 510 has its own instruction path and operates asynchronously with all parallel PEs. Therefore, the special functional unit 510 uses only a small quantity of hardware operation operators to match throughputs of a plurality of PE units while minimizing an area and power consumption. According to a specific application scenario, the special functional unit 510 may operate in two modes: a chain mode and a decoupling mode.

The chain mode is usually applied to an element-wise special function, such as an activation function of a neural network model. Usually, the data in the accumulative buffer 506 is written into the output queue 513, and then the special functional unit 510 reads the output queue 513 to execute the special function and writes a final result back into the output queue 513. In the chain mode, data in the accumulative buffer 506 is transferred directly to the special functional unit 510 instead of the output queue 513. In this way, the special functional unit 510 only needs a local output buffer address corresponding to each PE unit, and memory access to the output buffer 513 is reduced by ⅔. The decoupling mode is usually applied to some special functions, such as reduction, which require data on parallel PE units (input data is staggered among all PE units). When these special functions are executed, the data in the queue in the special functional unit 510 identifies, by using a mark/token, a PE to which the data belongs. By using the mark/token, the special functional unit 510 may effectively determine whether a current special function has been completed. Different from the chain mode, the decoupling mode requires a global output buffer address to flexibly access output data of any PE unit.

Figure 5B:
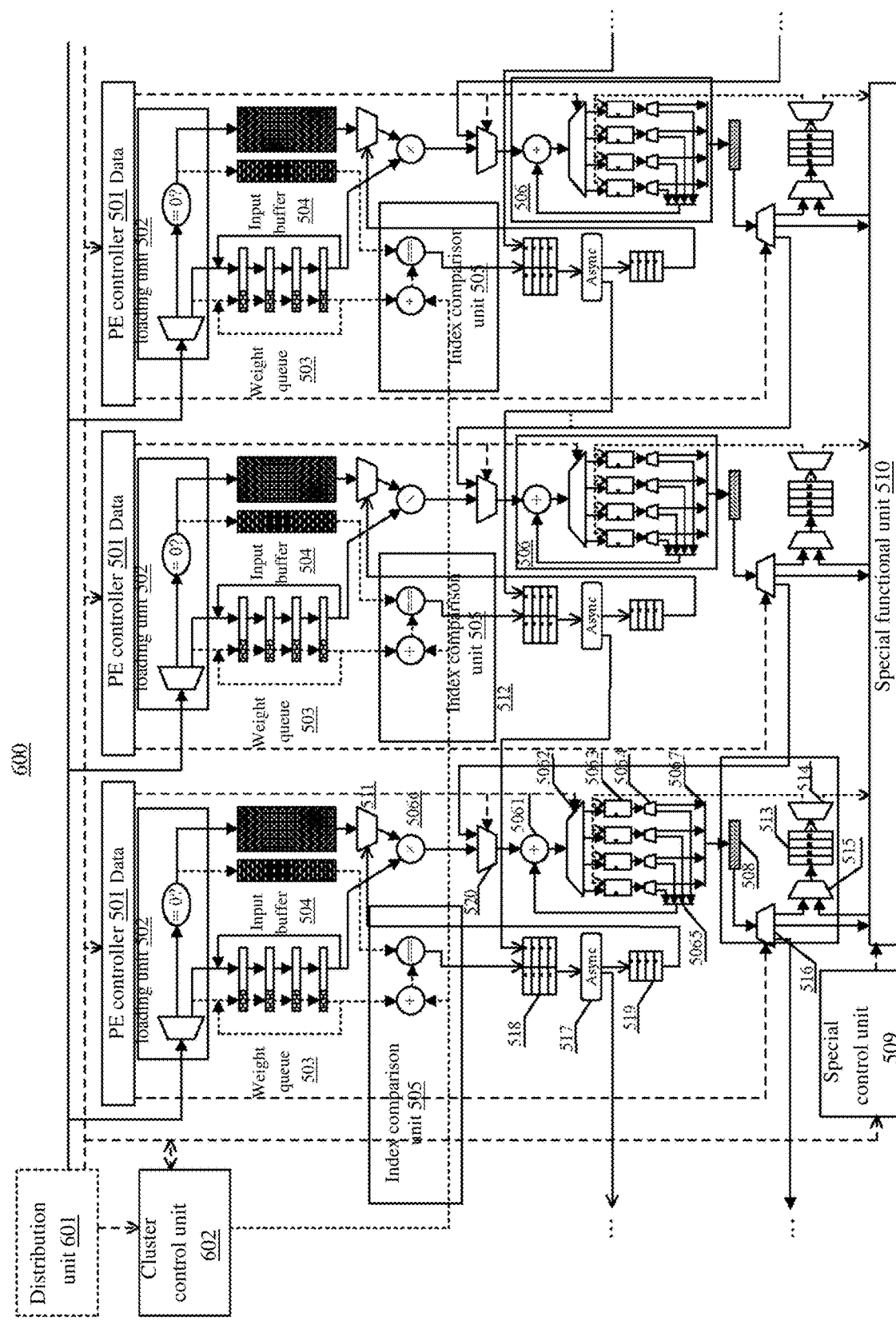
FIG. 5b illustrates a design diagram of another example PE cluster in accordance with some embodiments.

FIG. 5b is a design diagram of another example PE cluster. This design incorporates considerations on load balancing. As shown in the figure, hardware modules associated with load balancing include an index comparison unit 505, load queues 518 and 519 (with 518 being the first-level queue and 519 being the second-level queue), a load balancer 517, and a selector 520.

As shown in the figure, the index comparison unit 505 is responsible for generating a payload, where the payload is a matrix operation based on a non-zero weight and the activation data. The index comparison unit 505 includes a summator and a comparator. The summator is configured to add the weight index and a base address (the weight index is received from the weight queue 503, and the base address is obtained from the cluster control unit 602) to obtain an input index corresponding to a current weight value. The comparator retrieves a bit mask in the input buffer by using the input index, discovers a payload if the bit mask corresponding to the input index is equal to 1, and stores the input index into the first-level load queue 518. Note that the index comparison unit 505 processes two weight indexes in parallel and generates a payload of 0/1/2 according to activation sparsity.

According to the design of the index comparison module 505 above, the PE unit uses a design of two levels of load queues. The first-level load queue 518 uses a dual-width design to match a push load (payload of parallel 0/1/2) from the index comparison unit 505. The second-level load queue 519 uses a standard single-width design to facilitate the generation of an input index at a time (corresponding to each payload). Thus, the load queues of the first and second levels are loosely synchronized to process a problem of width mismatch.

In this embodiment, each of the PE units in a PE cluster has a load balancer 517. The load balancer 517 of one PE unit is connected to the first-level load queue 518 of the PE unit and the first-level load queue 518 of a neighboring PE unit. The load balancer 517 may be configured to detect load imbalance between the PE unit and the neighboring PE unit based on the payload quantity in their respective first-level load queues 518. After detecting the load imbalance, the load balancer 517 in the PE unit with heavier payload may forward the input index popped out from its first-level load queue 518 into the first-level load queue 518 of the PE unit with a lighter payload. In some embodiments, the load balancing implementation is as follows: an input index quantity (that is, a payload quantity) in the load queue 518 of the PE unit on the left (denoted as the idle PE unit) is far less than an input index quantity in the load queue 518 of the PE unit on the right (denoted as the busy PE unit), which means load imbalance exists. Therefore, when the load balancer 517 in the busy PE unit on the right detects that the load is unbalanced, load balancing is performed during run time. When load balancing is performed, a pop-up input index in the local load queue 518 in the busy PE unit is pushed to the load queue 518 in the idle PE unit on the left instead of the local load queue 519 of the busy PE unit. In addition, to implement load balancing, the input buffer 504 and the weight queue 503 in each PE unit need to be doubled. The additional space in the input buffer 504 and the weight queue 503 is used to store activation and weight data of the neighboring PE unit from which the load balancer therein may push load. For example, using the same example as the above, the input buffer 504 and the weight queue 503 of the idle PE unit on the left may store the activation and weight data of the busy PE unit on the right, so when the busy PE unit pushes (via the load balancer therein) load (index value) to the idle PE unit, the idle PE unit may obtain the corresponding data from its local input buffer 504 and weight queue 503. In this way, after the PE unit on the left obtains the input index from the PE unit on the right, it can directly extract the activation and weight data from the input buffer 504 and the weight queue 503 of the PE unit for operation. Certainly, implementation of load balancing is not limited to this embodiment, and other implementations exist. For example, switching between the PE units on the left and right in this embodiment is also applicable. For another example, each PE unit is required to periodically report a load status of the PE unit to the distribution unit 601, and the distribution unit 601 controls, based on the received load status of each PE unit, to send data and a to-be-executed instruction to a PE unit with a relatively low load.

As shown in the figure, the input index popped from the second-level load queue 519 is used to obtain activation data of a corresponding non-zero value. The pop-up input index is provided to a control end of the selector 511. The selector 511 outputs an activation value that matches the input index to the multiplier 5066, the multiplier 5066 simultaneously receives a weight value that matches the input index from the weight queue 503, and then the multiplier 5066 performs a multiplication operation. A product generated by the multiplier 5066 is then supplied to the summator 5061 for accumulation operations. The summator 5061 further receives a partial sum of the PE unit on the right as an input. An accumulation result output by the summator 5061 is provided to the selector 5062 to determine which buffer is used for storage. As shown in the figure, each PE unit has four heterogeneous accumulative buffers to maintain partial results of different inputs. Depending on different operations to be performed, data in the accumulative buffer 506 is transferred to different submodules, including: providing the data to the summator 506 for accumulative operations; the selector 516 provides the data to the input end of the selector 520 of the PE unit on the left; storing the data as an output result into an output queue 513; providing the data as input data to a special functional unit, for example, an activation function and reduction.

Figure 5C:
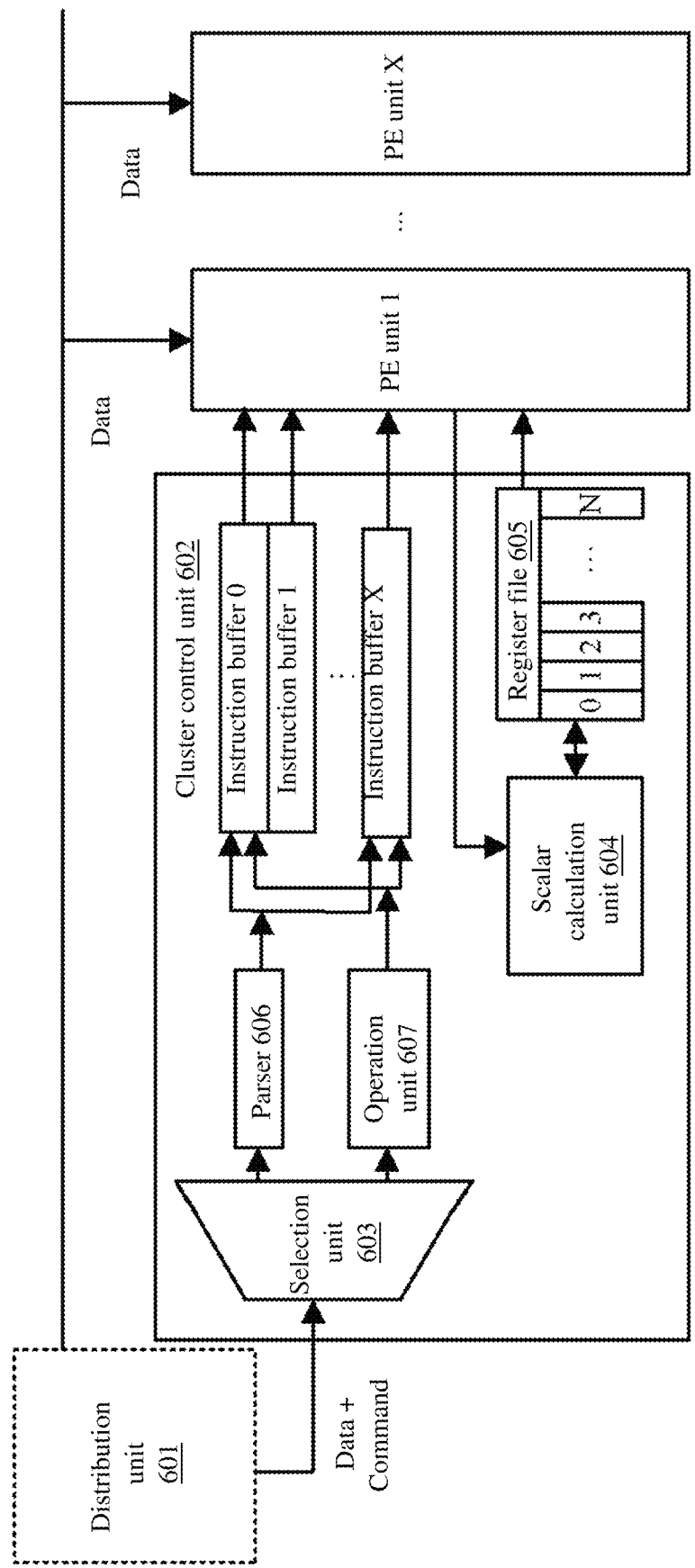
FIG. 5c illustrates a schematic structural diagram of a cluster control unit in FIG. 5a and FIG. 5b in accordance with some embodiments.

It should be noted that the PE cluster structure shown in FIG. 5b is an improved design for FIG. 5a. Therefore, some of the structures and functions described in FIG. 5a are not described in detail in FIG. 5b. FIG. 5c is a schematic structural diagram of a cluster control unit in FIG. 5a and FIG. 5b. The cluster control unit 602 is disposed in a PE cluster, and is configured to generate a plurality of control signals to be provided to a plurality of PE units coupled the cluster control unit 602. As shown in the figure, the cluster control unit/circuit 602 includes a selection unit/circuit 603, a plurality of instruction buffers 1 to X, a scalar calculation unit 604, a register file 605, a parser 606, and an operation unit (e.g., an operation circuit) 607. The selection unit 603 includes one input end and two output ends, and the two output ends are respectively coupled to the parser 606 and the operation unit 607. The parser 606 is separately coupled to the plurality of instruction buffers 0-X. The operation unit 607 is separately coupled to the plurality of instruction buffers 0-X. The plurality of instruction buffers 0-X are coupled to PE units 1-X (for simplicity, only a connection line between the instruction buffer 0-X and the PE unit 1 is depicted in the figure).

The instruction buffers 0-X are each configured to store an instruction sequence of a specified neural network application (target application). That is, different instruction buffers 0-X store different instruction sets for different neural network applications. Note that each instruction buffer can store a plurality of instructions and execute these instructions according to a program counter (PC) of the instruction buffer. Each instruction buffer uses an implicit loopback program counter (implicit loopback PC) to automatically transmit duplicate instructions. These instruction buffers may work independently for different hardware modules. Each instruction buffer has an independent instruction pipeline, and the instruction pipeline is not affected by another instruction sequence execution process (decoupled execution pipeline). It should be noted that, for convenience and efficient control of the instruction pipeline, these instruction buffers may trigger execution of each other. Operands of instructions in the instruction buffer are stored in different entries of the register file 605 (the register file 605 in the figure includes entries 0-N). The scalar calculation unit 604 is configured to: perform scalar calculation on an operand of an instruction, and update a corresponding entry of the register file according to a calculation result. In addition, because the PE unit performs vector multiplication, the scalar calculation unit 604 may further receive some intermediate calculation results of a plurality of PE units, and perform scalar calculation (for example, scalar accumulation), where a scalar calculation result may be stored in a corresponding entry in the register file. In this way, a scalar calculation speed can also be accelerated.

When the cluster control unit 602 works, the selection unit 603 in the cluster control unit 602 receives a command and data from the distribution unit 601, obtains a command type and a buffer identifier from the command, and determines whether the command type is configuration or execution; if the command type is configuration, provide the received data and the buffer identifier to the parser 606; and if the command is execution, provided the buffer identifier to the operation unit 607.

The parser 606 is configured to parse out an instruction sequence from the data received from the distribution unit 601, store the instruction sequence into an instruction buffer that matches the buffer identifier, and store an operand of each instruction of the instruction sequence into a corresponding entry of the register file. Optionally, the parser further determines, according to an original operand of each instruction in the instruction sequence, an operand when the instruction is executed on each PE unit, and stores, into a corresponding entry of the register file, the operand determined by the parser. For example, if the original operand of each instruction is a data address, when the instruction needs to be allocated to a plurality of PE units for execution, a data address at the time of execution (denoted as runtime data address) by each PE unit is determined according to the original data address.

The operation unit 607 receives the buffer identifier, and drives/triggers the instruction buffer corresponding to the buffer identifier to execute each instruction one by one, so as to generate a control signal, where a control signal of each instruction and an operand of the instruction in the register file are sent to a plurality of execution units, and each execution unit performs a corresponding operation based on a received control signal and operand.

In fact, processing of the specified neural network application may be divided into two stages: a configuration stage and an execution stage. In the configuration phase, the instruction buffers 0-X are initialized as an instruction sequence of the specified neural network application, and each entry in the register file is initialized as an operand of each instruction of the instruction sequence of the specified neural network application. In the execution phase, the distribution unit 601 sends the operation data of the specified neural network application to each PE cluster, and at the same time, the distribution unit 601 sends a command, where the command includes an identifier (ID) of an instruction buffer to perform selection, and the operation unit 607 drives, by using the identifier, each instruction, to be executed one by one, in an instruction sequence that is preloaded into a corresponding instruction buffer. These instructions generate a control signal for each PE unit in an execution process. Each PE unit loads operation data of the PE unit from the operation data of the specified neural network application according to the received control signal, and then the PE unit may perform a corresponding operation based on the operation data of the PE unit and according to the received control signal.

In addition, the distribution unit 601 uses a packed design when distributing instructions/data to the PE clusters. The packed design refers to data packed together with a command. In the configuration phase, the command indicates an instruction buffer selected to store the instruction sequence with the command. In the execution phase, the command indicates an instruction buffer selected to process the operation data with the command.

In addition, when the specified neural network application is processed, an instruction pipeline corresponding to the specified neural network application is separated from a hardware pipeline of the PE unit to avoid interference. Depending on different neural network applications, the acceleration unit in this embodiment of the present disclosure uses two types of instruction pipelines.

The first type of instruction pipeline includes two levels: an instruction decoding (ID) level and a fetching operand (FO) level. In the instruction decoding level, a control signal is generated according to an operation code of a current instruction. In the fetching operand level, a required operand (for example, a buffer address or an identity of an accumulative buffer) is taken out of the register file. Then, each PE unit is instructed to process data coupled to the current instruction. In this case, the instruction pipeline only provides necessary information to each PE unit, and no other operation is required. It should be noted that the instruction pipeline of this type is designed for neural network applications that do not need to update an operand of an instruction. Such neural network applications are, for example, matrix multiplication (SPMV and SPMM).

The second type of instruction pipeline includes four levels: an instruction decoding (ID) level, a fetching operand (FO) level, a scalar calculation unit processing (SU) level, and a write back (WB) level. The first two levels (ID and FO) are the same as the first two levels in the instruction pipeline of the first type. However, different from the instruction pipeline of the first type, the instruction pipeline of the second type is designed for neural network applications that need to update an operand of an instruction after execution by the PE unit ends. These neural network applications include convolution (spCONV) and depth-wise convolution (Depth-wise CONY). In the scalar calculation unit processing level, the scalar calculation unit 604 is configured to perform scalar calculation to update a corresponding operand of a current instruction. The updated operand is then written back to a corresponding entry in the register file in the write back level.

In the present disclosure, an instruction design is implemented based on a finite state machine (FSM) and a data-related instruction. Specifically, a behavior of the PE unit depends on three key factors: a command packed with data, an instruction stored in the instruction buffer, and a state of a scalar pipeline. Specific designs of the three factors are described below.

First, in the configuration phase, the distribution unit 601 transmits the instruction sequence of the specified neural network application and a command including the identifier (ID) of the instruction buffer to the PE cluster. In this case, the identifier of the instruction buffer in the command indicates an instruction buffer into which the instruction sequence transmitted together with the command is to be stored. In the execution phase, the distribution unit sends operation data (which may be a portion or all of operation data of the specified neural network application) and a command that includes the identifier (ID) of the instruction buffer to the PE cluster. In this case, the identifier of the instruction buffer in the command indicates that the operation data transmitted with the command is to be processed by using an instruction sequence stored in the instruction buffer corresponding to the identifier. An example command design is shown in the following table.

TABLE 1

| 1 bit | 1 bit | 1 bit | 5 bits |
|---|---|---|---|
| CONFIG | | Reserved | Inst.Buffer ID |
| EXE | Shift | Last | Inst.Buffer ID |

A command uses a total of 8 bits to minimize additional overheads of data transmission between the distribution unit and the PE cluster. There are two types of commands a configuration command and an execution command, corresponding to the configuration phase and the execution phase respectively. Referring to Table 1, an operation code (CONFIG or EXE) occupies the first bit. In the configuration command, the second to the third bits are reserved, and the fourth to the eighth bits are used to code the identifier of the instruction buffer. In the execution command, the second bit is an identifier that determines whether the PE unit moves the accumulation result out. The third bit indicates whether a current data segment of the PE unit is the last data segment of the input data. If yes, the accumulation result is written back to the output buffer. Similar to the configuration command, the fourth to the eighth bits of the execution command are used to code the identifier of the instruction buffer.

Table 2 shows the instruction design in the instruction buffer. These four instructions cover all operations involved in neural network applications (spMV, spMM, spCONV, and Depth-wise CONY).

TABLE 2

| 2 bits | 1 bit | 1 bit | 4 bits | 2 bits | 2 bits |
|---|---|---|---|---|---|
| MAC | Balance | SPU_EN | Act Entry(Base Addr) | Acc Entry(Buf ID) | Reserved |
| LD | | Reserved | Act Entry(Base Addr) | | Reserved |
| ST | | Reserved | Out Entry(Base Addr) | | Reserved |
| SFU | | Type | SPU In Entry | | SPU Out Entry |

As shown in Table 2, the first bit and the second bit are used to code the operation code. For a multiplication accumulation instruction (MAC), the third bit and the fourth bit respectively indicate whether load balancing and whether a special functional unit is activated. The fifth to the eighth bits are used to code a base address of the input buffer, the ninth bit and the tenth bit are used to code the identifier of the accumulative buffer, and the last two bits are reserved. For a data loading instruction and a data storage instruction (LD/ST), the fifth to the eighth bits are used to code a base address to be imported/stored into the input/output buffer. For an instruction of SPU (special function), the third bit and the fourth bit indicate a type of the special function to be executed. Note that in this design, it is directly described that the output buffer is also coded as a type of a special function (Non-SF), and the fifth bit to the eighth bit and the ninth bit to the twelfth bit are used to code buffer addresses of input data and output data of the special function.

The state of the scalar pipeline is mainly used to control the behavior of the weight queue. The scalar pipeline has three states, which are applied to different neural network applications. For spMV and spMM, the weight queue is used as a mobile queue and a state of a corresponding scalar pipeline is determined as a first-in first-out queue (SQ). However, because spCONV needs the weight queue to support a rotation operation of a loopback path, a corresponding state is determined as a rotation queue.

In depth-wise convolution (Depth-wise CONY), the weight queue actually stores the activation data. To minimize data transmission between the distribution unit and the PE cluster, a sliding window is implemented to generate an overlapping area and pop up only data from the overlapping area instead of popping up all activation data from the weight queue. In this way, the weight queue operates in a sliding window mode, so that a corresponding scalar pipeline state is referred to as a sliding window queue. As a result, first-in first-out popup data is usually in the SQ state; in the RQ state, data is cyclically popped up (the loopback path implements weight multiplexing); and in the SW state, the data is loaded to the PE unit and exported from the PE unit.

The following describes an instruction sequence of spMV. An instruction sequence of another application may be generated by modifying a portion of the instruction sequence of spMV. Based on the instruction sequence of spMV, it can be learned how to use these instruction sets to execute another application. The instruction sequence of spMV is divided into five main phases.

The first phase is to configure an instruction buffer (that is, the above CONFIG) before the execution phase.

The second phase is to write the activation data and generate a bit mask (a corresponding instruction is LD) during execution.

The third phase is to write a partial accumulation result (a corresponding instruction is LD).

The fourth phase is execution (a corresponding instruction is MAC, including indication information of Balance and SPU).

The fifth phase is read (a corresponding instruction is ST).

The following focuses on instructions executed on the PE cluster. In the first phase, only instructions related to configuration are executed to initialize the instruction buffer, the scalar calculation unit, and the register file. In the second phase and the third phase, the LD instruction is executed to load data into the PE cluster. In the fourth phase, MAC instructions with different configurations (shifting, Load balancing, SPU, and the like) are executed according to various configurations from the command in the distribution unit and before the execution stage. In the fifth phase, the ST instruction is executed to export the data from the PE cluster.

According to the instruction sequence of spMV, we can generate an instruction sequence of another neural network application. For spMM, the instruction buffer in the fourth phase should include a plurality of MAC instructions. These MAC instructions are transmitted and executed according to a PC of the instruction buffer. For spCONV, after a preconfigured MAC instruction, the weight queue is instructed to rotate according to the state of the scalar pipeline. Depth-wise convolution (Depth-wise CONY) uses an instruction sequence similar to that of spMV, and the only difference is that roles of the weight data and the activation data are interchanged in depth-wise convolution.

Mapping a Neural Network Application to an Acceleration Unit in an Embodiment of the Present Disclosure for Execution The acceleration unit may support a plurality of neural network applications, and commonly used neural network applications include: matrix multiplication (Matrix Multiplication), convolution, and depth-wise convolution (depth-wise convolution). The most basic operations of these neural network applications are multiplication and accumulation. Therefore, the PE unit designed in the disclosed embodiments mainly completes multiplication and accumulation operations. The following provides detailed description based on a neural network application.

Figure 6A:
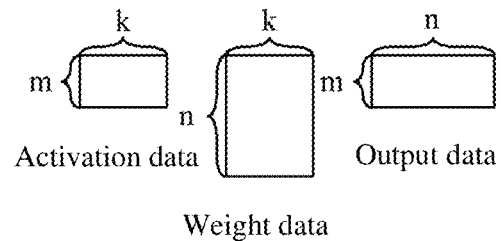
FIG. 6a illustrates a schematic diagram of matrix multiplication in accordance with some embodiments.

FIG. 6a is a schematic diagram of matrix multiplication. As shown in FIG. 6a, activation data is a two-dimensional matrix of m*k, m represents a row, k represents a column, weight data is a matrix of k*n, k represents a row, n represents a column, output data is a matrix of m*n, m represents a row, and n represents a column. For example, A is a matrix of 2*3, B is a matrix of 3*2, and C is a matrix product of A and B and is a matrix of 2*2. An operation process of C is as follows:

$$A = \begin{bmatrix} a11 & a12 & a13 \\ a21 & a22 & a23 \end{bmatrix} \quad \text{Formula (1)}$$

$$B = \begin{bmatrix} b11 & b12 \\ b21 & b22 \\ b31 & b32 \end{bmatrix} \quad \text{Formula (2)}$$

$$C = AB = \quad \text{Formula (3)}$$
$$\begin{bmatrix} a11b11 + a12b21 + a13b31 & a11b12 + a12b22 + a13b32 \\ a21b11 + a22b21 + a23b31 & a21b12 + a22b22 + a23b32 \end{bmatrix}$$

Figure 6B:
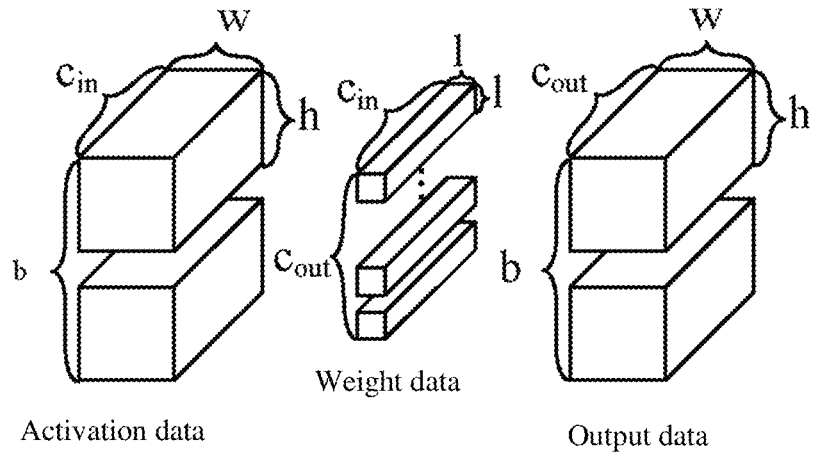
FIG. 6b and FIG. 6c illustrate schematic diagrams of convolution and depth-wise convolution in accordance with some embodiments.
Figure 6C:
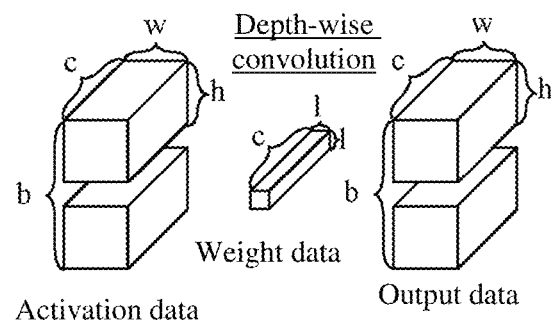

As shown in FIG. 6b and FIG. 6c, more dimensions are included in convolution and depth-wise convolution. Referring to FIG. 6b, the activation data, the weight data, and the output data are all four-dimensional matrices (in this specification, one-dimensional and two-dimensional matrices are referred to as low-dimensional matrices, and three-dimensional and higher-dimensional matrices are referred to as high-dimensional matrices). Parameters of the activation data are [b, w, h, cin], parameters of the weight data are [cout, 1, 1, cin], and parameters of the output data are [b, w, h, cout]. For convenience of understanding, this example is understood as a convolution operation on image data. b represents a quantity of images, w and h represent a width and a height in an image size, and cin represents a quantity of channels, for example, cin of an RGB image is equal to 3. The convolution operation may be understood as a process in which a convolution core of 1*1*cin is used to scan each image (a cube defined by cin, w, and h in the figure) to obtain an output image. A corresponding calculation process of the convolution operation is: first calculating an inner product of a matrix of 1*1 and a corresponding feature element in a two-dimensional image, summing values of inner products, and then adding a sum of inner products of cin corresponding coordinates as values of corresponding coordinates in a two-dimensional feature map. In other words, the convolution core of 1*1*cin and an image defined by [w, h, and cin] are calculated to obtain a two-dimensional feature map of w*h. cout convolution cores of 1*1*cin and an image defined by [w, h, cin] are calculated to obtain an output feature map of cout*w*h. Because there are b images that are used as activation data, b output feature maps of cout*w*h are finally obtained. A calculation process of depth-wise convolution in FIG. 6c includes: first calculating an inner product of a convolution core of 1*1 and a corresponding feature element in an input two-dimensional image, and using a sum of values of inner products as a value of a corresponding coordinate on an output two-dimensional feature diagram, where c is a quantity of channels of the input and the convolution core, and remains unchanged as a quantity of channels of the output image, to finally obtain b feature maps of c*w*h.

It may be found from the foregoing content that a basic operation of convolution and depth-wise convolution is a matrix operation (multiplication and accumulation), but convolution and depth-wise convolution involve more dimensions. However, during program processing, high-dimensional matrix operations of convolution and depth-wise convolution may be converted into a plurality of low-dimensional matrix operations of a plurality of iterations. FIG. 6a to FIG. 6c are used as an example. bwh in FIG. 6b and FIG. 6c corresponds to m, cin corresponds to k in FIG. 6a, and cout corresponds to n in FIG. 6a. In this manner, convolution and depth-wise convolution indicated in FIG. 6b to FIG. 6c are converted into matrix operations of a two-dimensional matrix m*k and k*n of a plurality of iterations. When a neural network application is performed, an operation of loading data required for each operation into the on-chip memory 236 by using a direct memory access (DMA) module 235 is further involved.

During implementation, there are a plurality of implementations of converting high-dimensional matrix operations of convolution and depth-wise convolution into a plurality of low-dimensional matrix operations of a plurality of iterations. In this embodiment, three mapping methods are defined: an input stationary (input stationary) mapping method, a weight stationary (weight stationary) mapping method, and an output stationary (output stationary) mapping method. When processing the neural network application, the command processor 238 may select one of the mapping methods. For each neural network application, a preferred mapping manner should reduce data transmission between the acceleration unit 2301 and the external memory 210. Therefore, the acceleration unit 2301 may configure a preferred mapping method for each neural network application, so that a corresponding method is used when each neural network application is executed.

The following uses matrix multiplication as an example to describe the three mapping methods.

A core idea of the input stationary mapping method is to keep activation data in a PE array as long as possible. The following describes a pseudo code example shown in FIG. 7a. The segment of pseudo code includes a plurality of iterations (a quantity of iterations is determined by iter_n0, iter_k0, and iter_m0), and each iteration specifies one two-dimensional matrix multiplication that runs on the PE array. Symbols of an input matrix of the two-dimensional matrix multiplication are i (activation data) and w (weight data), and a symbol of an output matrix is o. For i, a row start sequence number and a row end sequence number of i in a two-dimensional matrix (converted from activation data of a high-dimensional matrix) are defined by using m_start and m_end, and a column start sequence number and a column end sequence number of i in the two-dimensional matrix are defined by using k_start and k_end. Similarly, for w, a row start sequence number and a row end sequence number of w in a two-dimensional matrix (converted from weight data of the high-dimensional matrix) are defined by using k_start and k_end, and a column start sequence number and a column end sequence number of w in the two-dimensional matrix are defined by using n_start and n_end. For o, the same holds true.

It can be learned from the pseudo code that, as a conditional statement of a nested loop, n changes before k and k changes before m, and a two-dimensional matrix from the weight data and defined by k*n changes before a two-dimensional matrix from the activation data and defined by m*k. Therefore, when m and k remain unchanged and n changes, a two-dimensional matrix defined by m*k is deployed on the PE array for a period of time, and a two-dimensional matrix defined by k*n is continuously loaded from the external memory and transported into the PE array. When k changes, the two-dimensional matrix defined by m*k changes. In this case, new m*k is loaded from the external memory into the PE array. With this design, the activation data (m*k) stays in the PE array longer than the weight data (k*n). In addition, the output two-dimensional matrix defined by m*n sometimes needs to be written back into the memory 210. It should be noted that if the PE array can maintain all two-dimensional matrices defined by m*k, it is not necessary to use the input stationary mapping method.

A core idea of the output stationary mapping method is to keep output data in the on-chip memory 236 as long as possible. Corresponding pseudo code is shown in FIG. 7b. For analysis of this segment of pseudo code, refer to the foregoing description. It should be noted that when all the activation data can be stored in the on-chip memory 236, it is not necessary to use an input stationary data loading method.

A core idea of the weight stationary mapping method is to keep the weight data in the on-chip memory 236 as long as possible (longer than the activation data). Corresponding pseudo code is shown in FIG. 7c. For analysis of this segment of pseudo code, refer to the foregoing description. It should be noted that the weight stationary mapping method can only be used when the weight data is separated from calculation. If the weight data and calculation overlap together, the weight stationary mapping method cannot be used. When the weight stationary mapping method is used, before the command processor 238 loads new activation data into the on-chip memory 236, a portion of current result data (obtained by means of calculation by using the PE array) needs to be written back into the memory 210.

When the foregoing mapping method is performed, a problem of a data transfer pipeline (data transfer pipeline) needs to be further considered. Referring to the pseudo code in FIG. 7a, when the PE array performs (k+1)th iteration calculation, the PE array first loads activation data and weight data of this iteration from the on-chip memory 236. The activation data and the weight data in this iteration are loaded from the memory 210 into the on-chip memory 236 by the command processor 238 in a kth iteration. Note that the on-chip memory 236 is used as a global storage area, and each storage unit is designed as two ping-pong buffer units. The two ping-pong buffer units may be implemented with two different storage chips, or two different memory sections within the storage unit. A first unit is configured to load data from the memory 210, a second unit is configured to provide data for the PE array, and the first unit and the second unit switch roles after each iteration of processing in the PE array. For instance, if the data for a first iteration of execution is loaded and stored in the first unit, the first unit will be used to feed data into the PE array, and at the same time, the second unit may load the data for the next iteration. After the first iteration is finished, the second unit may have loaded the required data, and may be used to feed the required data into the PE array. At the same time, the first unit may load the data for the next (e.g., third) iteration. Thus, during PE calculation, activation and weight data of a next iteration are transmitted from the memory 210 to the on-chip memory 236, and the activation and the weight data of the next iteration are transmitted from the on-chip memory 236 to the PE array. Therefore, if calculation time of the PE array is greater than time for loading the activation and weight data from the memory 210, time for loading the activation and weight data from the memory 210 is hidden within the calculation time of the PE array, which will help improve execution efficiency of the acceleration unit. In the last iteration, input activation data and weight data need to be prepared for the first iteration in a next group. In addition, the output data will be written back into the memory 210 from the PE array in the last iteration. The operation of writing the output data back into the memory 210 from the on-chip memory 236 is performed in the first iteration of the next group.

Data Segmentation Method Performed in an Acceleration Unit in an Embodiment of the Present Disclosure Referring to the foregoing description, the command processor 238 loads, by using the direct memory access module 235, data required for each iteration into each storage unit of the on-chip memory 236, and then distributes the data to the PE cluster by using the distribution unit, and the PE cluster further distributes the data to the PE unit. In this process, the distribution unit generally segments the matrix according to dimensions m, n, and k to obtain a matrix that can be distributed to the PE cluster.

Figure 8:
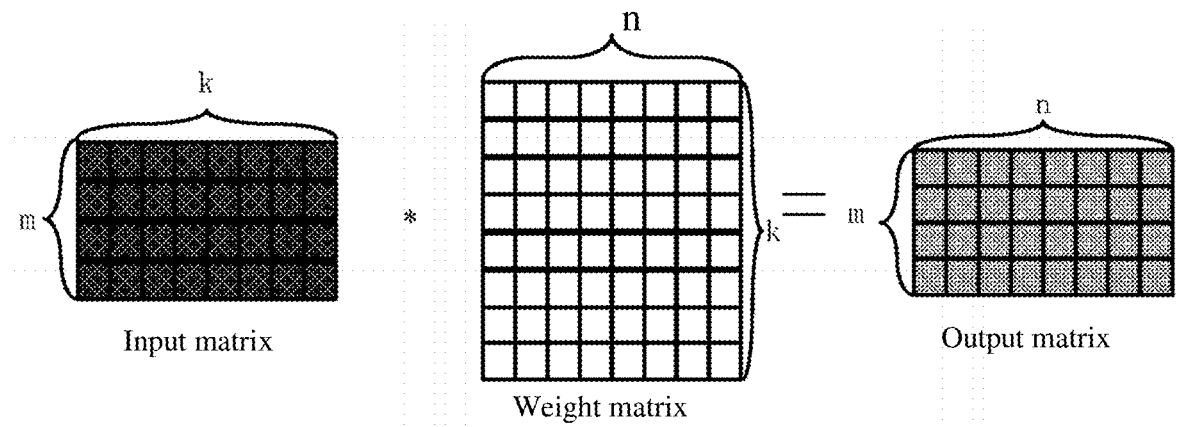
FIG. 8 illustrates a schematic diagram of example two-dimensional matrix multiplication in accordance with some embodiments.

Referring to FIG. 8, activation data is a two-dimensional matrix in which a quantity of rows is 4 and a quantity of columns is 8; weight data is a two-dimensional matrix in which a quantity of rows is 8 and a quantity of columns is 8; and an output matrix is a two-dimensional matrix in which a quantity of rows is 4 and a quantity of columns is 8. The following describes how to deploy matrix multiplication shown in FIG. 8 to a PE array of 2*2 for execution, where the PE array of 2*2 includes a PE cluster (0, 0), a PE cluster (1, 0), a PE cluster (0, 1), and a PE cluster (1, 1). In our design, each PE cluster is a two-dimensional grid. Therefore, when the foregoing matrix is mapped to the PE array, there are three choices in each dimension, and there are nine choices in total.

FIG. 9a to FIG. 9i illustrate nine choices for deploying the matrix multiplication shown in FIG. 8 to a PE array. In the figure, I, W, and O represent activation data, weight data, and an output matrix of the matrix multiplication performed in the corresponding PE cluster, respectively.

Figure 9A:
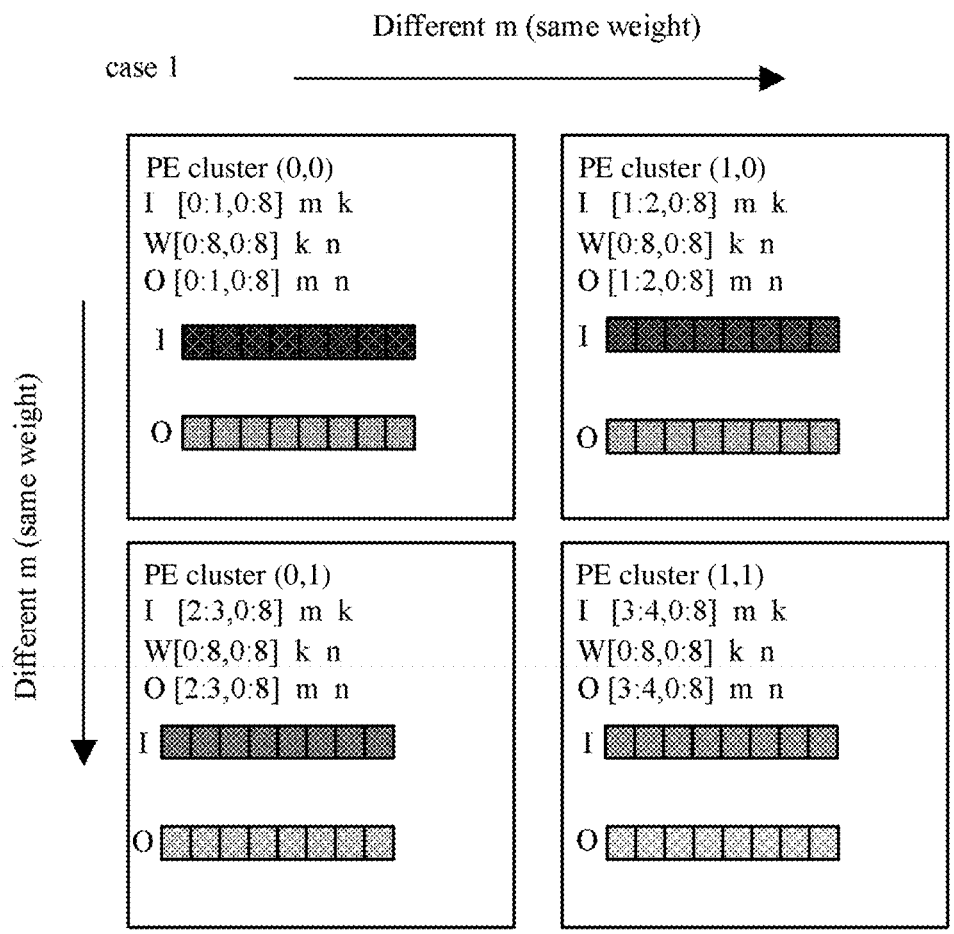
FIG. 9a to FIG. 9i illustrate nine choices of deploying the matrix multiplication shown in FIG. 8 to a PE array.

In FIG. 9a, the PE cluster (0, 0) executes a task of multiplying the first row (that is, I[0:1, 0:8]) of the activation data by the weight data (that is, W[0:8, 0:8]), and an execution result is to output the first row (that is, O [0:1, 0:8]) of output data. [0:1, 0:8] in I[0:1, 0:8] specifies rows and columns of input data, [0, 1] represents the first row, [0, 8] represents the first column to the eighth column, W[0:8, 0:8] represents a matrix formed by the first row to the eighth row and the first column to the eighth column in the weight data, that is, complete weight data, and O [0:1, 0:8] represents a matrix formed by the first row and the first column to the eighth column in the output data. Data in FIG. 9a to FIG. 9i are represented in the same manner, and therefore details are not provided below. The PE cluster (1, 0) executes a task of multiplying the second row (that is, I[1:2,0:8]) of the activation data by the weight data (that is, W[0:8, 0:8]), and an execution result is to output the second row (that is, O[1:2,0:8]) of an output matrix. The PE cluster (0, 1) executes a task of multiplying the third row (that is, I[2:3,0:8]) of the activation data by the weight data (that is, W[0:8, 0:8]), and an execution result is to output the third row (that is, [2:3,0:8]) of the output matrix. The PE cluster (1, 1) executes a task of multiplying the fourth row (that is, 1[3:4,0:8]) of the activation data by the weight data (that is, W[0:8, 0:8]), and an execution result is to output the fourth row (that is, O [2:3,0:8]) of the output matrix.

It may be learned from FIG. 9a that input and output matrices that participate in matrix multiplication in the PE cluster (0, 0) to the PE cluster (1, 1) are different, but the weight data that participates in matrix multiplication in the PE cluster (0, 0) to the PE cluster (1, 1) is the same, that is, the weight data is shared among the PE cluster (0, 0) to the PE cluster (1, 1).

Figure 9B:
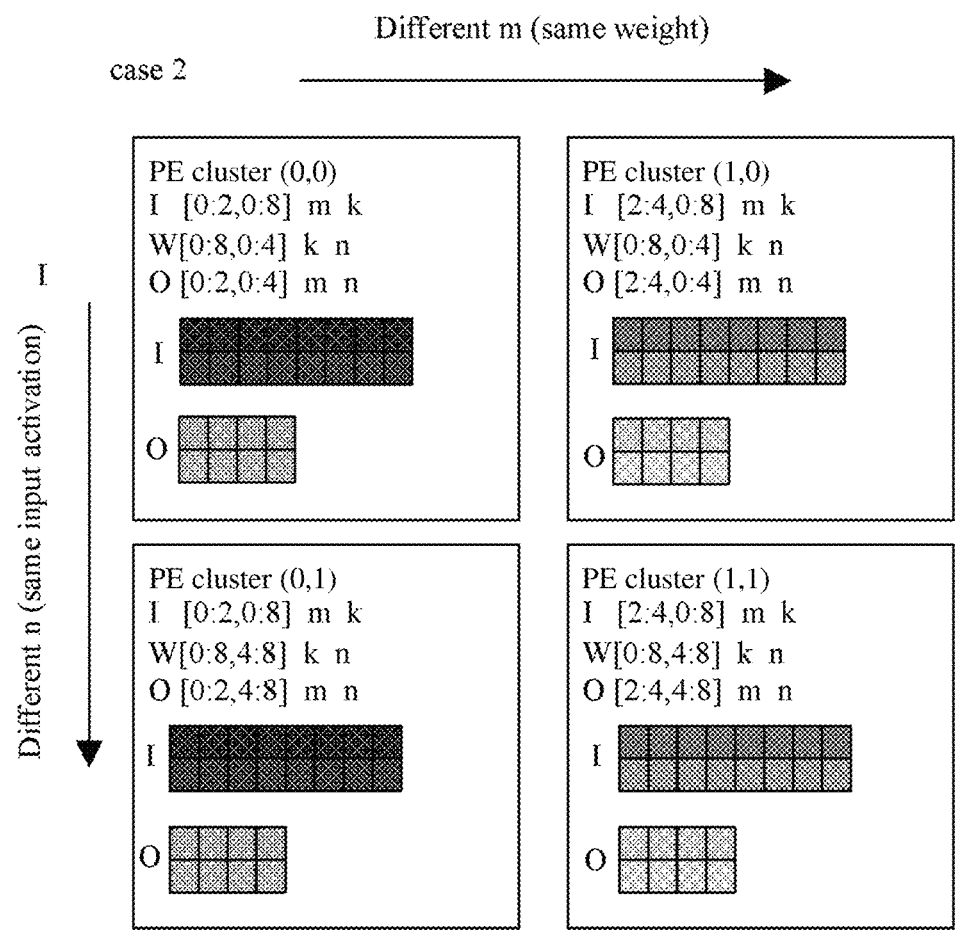

In FIG. 9b, the PE cluster (0, 0) executes a task of multiplying the first two rows (I[0:2, 0:8]) of the activation data by the first four columns (that is, W[0:8, 0:4]) of the weight data, and an execution result is to output the first two rows and the first four columns (that is, O[0:2, 0:4]) of the output data. The PE cluster (1, 0) executes a task of multiplying the last two rows (that is, I[2:4,0:8]) of the activation data by the first four columns (that is, W[0:8, 0:4]) of the weight data, and an execution result is to output the first two rows and the first four columns (that is, O[0:2,0:4]) of the output matrix. The PE cluster (0, 1) executes a task of multiplying the first two rows (that is, I[0:2,0:8]) of the activation data by the last four columns (that is, W[0:8, 4:8]) of the weight data, and an execution result is to output the first two rows and the last four columns (that is, [0:2,4:8]) of the output matrix. The PE cluster (1, 1) executes a task of multiplying the first two rows (that is, I[2:4,0:8]) of the activation data by the last four columns (that is, W[0:8,4:8]) of the weight data, and an execution result is to output the first two rows and the last four columns (that is, O[2:4,4:8]) of the output matrix.

It may be learned from FIG. 9b that input and output matrices that participate in matrix multiplication in the PE cluster (0, 0) to the PE cluster (1, 1) are different, but the weight data in the PE cluster (0, 0) and the PE cluster (1, 0) is the same, and the weight data in the PE cluster (0, 1) and the PE cluster (1, 1) is the same.

Figure 9C:
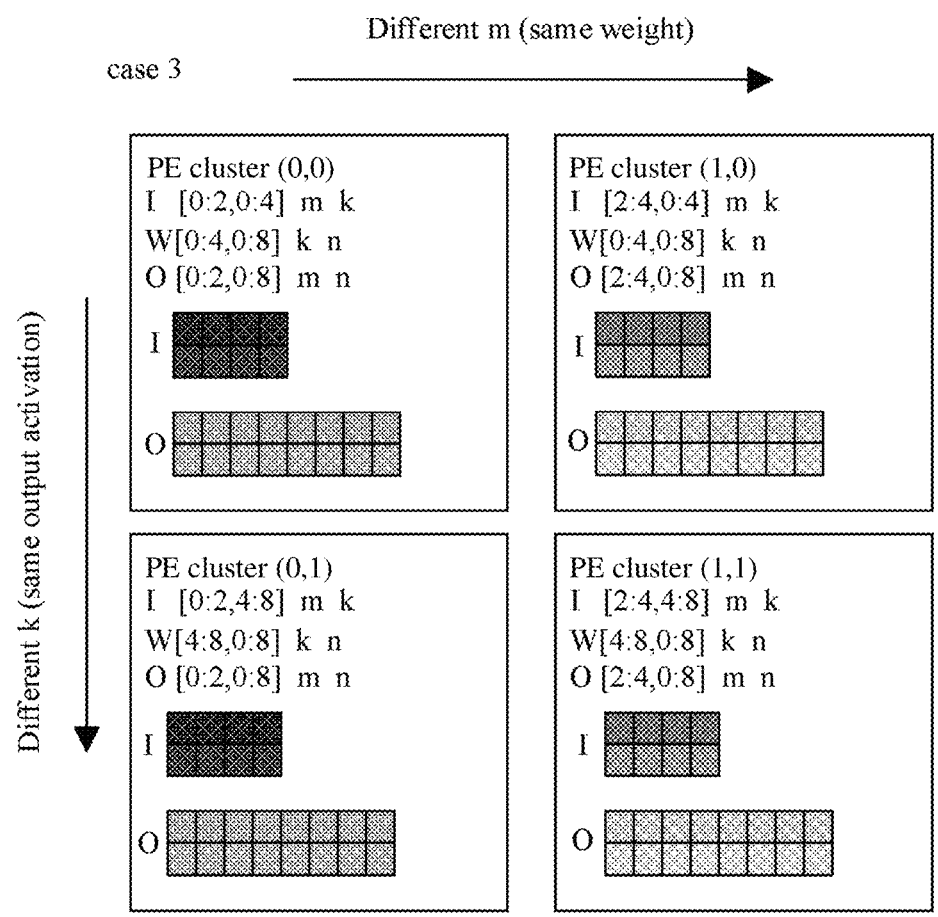

In FIG. 9c, the PE cluster (0, 0) executes a task of multiplying the first two rows and the first four columns (I[0:2,0:4]) of the activation data by the first four rows (that is, W[0:4,0:8]) of the weight data, and an execution result is to output the first two rows (that is, O[0:2,0:8]) of the output data. The PE cluster (1, 0) executes a task of multiplying the last two rows and the first four columns (that is, I[2:4,0:4]) of the activation data by the first four rows (that is, W[0:4, 0:8]) of the weight data, and an execution result is to output the last two rows (that is, O[2:4,0:8]) of the output matrix. The PE cluster (0, 1) executes a task of multiplying the first two rows and the last four columns (I[0:2,4:8]) of the activation data by the last four rows (that is, W[4:8,0:8]) of the weight data, and an execution result is to output the first two rows (that is, [0:2,0:8]) of the output matrix. The PE cluster (1, 1) executes a task of multiplying the first two rows and the last four columns (that is, I[2:4,4:8]) of the activation data by the last four rows (that is, W[4:8,0:8]) of the weight data, and an execution result is to output the first two rows (that is, O [2:4,0:8]) of the output matrix.

It may be learned from FIG. 9c that matrices output from the PE cluster (0, 0) and the PE cluster (0, 1) are the same, and values at positions corresponding to the two matrices need to be added to obtain a final value. Similarly, matrices output by the PE cluster (1, 0) and the PE cluster (1, 1) are the same, and values at positions corresponding to the two matrices need to be added to obtain a final value.

Figure 9D:
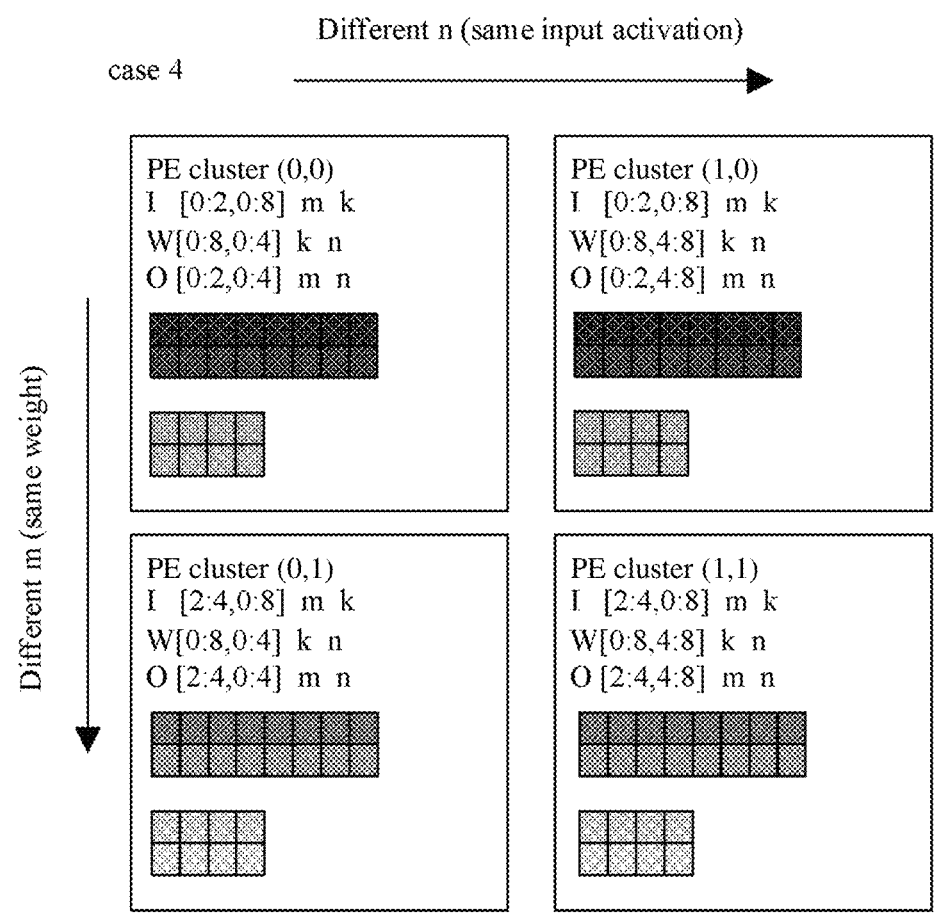

In FIG. 9d, the PE cluster (0, 0) executes a task of multiplying the first two rows (I[0:2, 0:8]) of the activation data by the first four columns (that is, W[0:8, 0:4]) of the weight data, and an execution result is to output the first two rows and the first four columns (that is, O[0:2, 0:4]) of the output data. The PE cluster (1, 0) executes a task of multiplying the first two rows (that is, I[0:2,0:8]) of the activation data by the last four columns (that is, W[0:8, 4:8]) of the weight data, and an execution result is to output the first two rows and the last four columns (that is, O[0:2,4:8]) of the output matrix. The PE cluster (0, 1) executes a task of multiplying the last two rows (I [2:4,0:8]) of the activation data by the first four columns (that is, W[0:8, 0:4]) of the weight data, and an execution result is to output the last two rows and the first four columns (that is, [2:4,0:4]) of the output matrix. The PE cluster (1, 1) executes a task of multiplying the last two rows (that is, I[2:4,0:8]) of the activation data by the last four columns (that is, W[0:8,4:8]) of the weight data, and an execution result is to output the last two rows and the last four columns (that is, O [2:4,4:8]) of the output matrix.

Based on FIG. 9d, output matrices on the PE cluster (0, 0) to the PE cluster (1, 1) are combined to obtain a final matrix multiplication result.

Figure 9E:
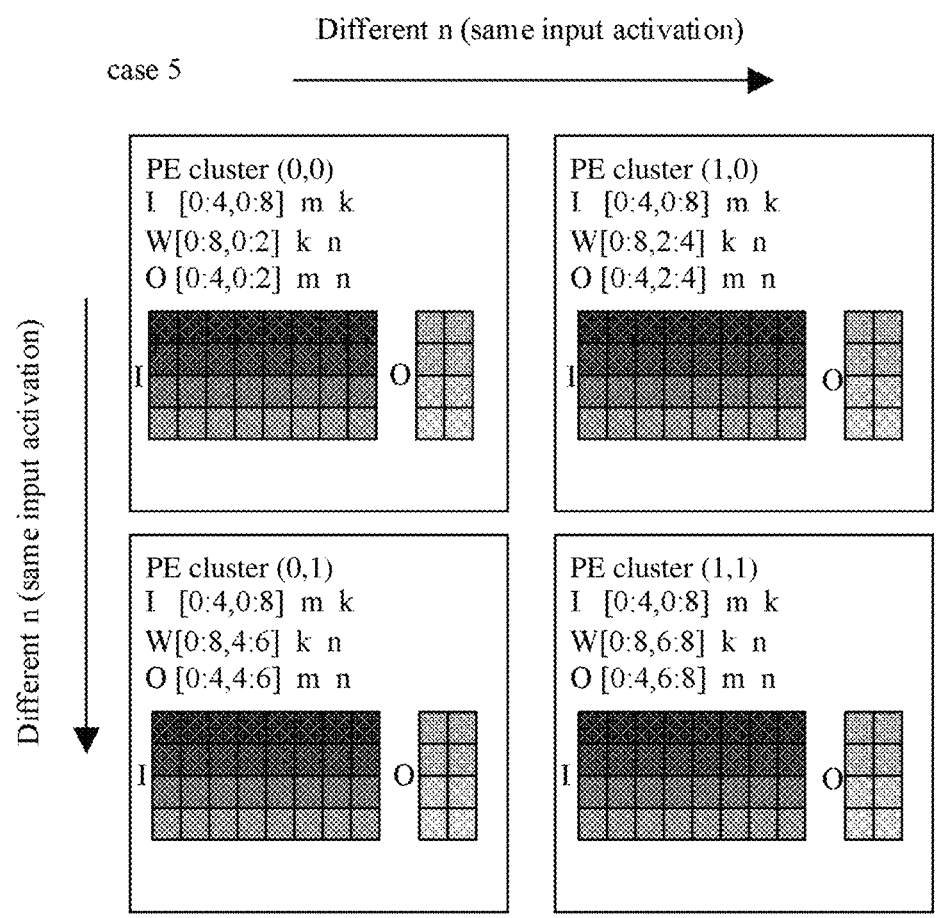

In FIG. 9e, the PE cluster (0, 0) executes a task of multiplying the activation data (I[0:4,0:8]) by the first two columns (that is, W[0:8,0:2]) of the weight data, and an execution result is to output the first two columns (that is, O[0:4, 0:2]) of the output data. The PE cluster (1, 0) executes a task of multiplying the activation data (that is, I[0:4,0:8]) by the third column and the fourth column (that is, W[0:8, 2:4]) of the weight data, and an execution result is to output the third column and the fourth column (that is, O[0:4,2:4]) of the output matrix. The PE cluster (0, 1) executes a task of multiplying the activation data (I[0:4,0:8]) by the fifth column and the sixth column (that is, W[0:8,4:6]) of the weight data, and an execution result is to output the fifth column and the sixth column (that is, [0:4,4:6]) of the output matrix. The PE cluster (1, 1) executes a task of multiplying the activation data (that is, I[0:4,0:8]) by the seventh column and the eighth column (that is, W[0:8,6:8]) of the weight data, and an execution result is to output the seventh column and the eighth column (that is, O[0:4,6:8]) of the output matrix.

Based on FIG. 9e, output matrices on the PE cluster (0, 0) to the PE cluster (1, 1) are combined to obtain a final matrix multiplication result.

Figure 9F:
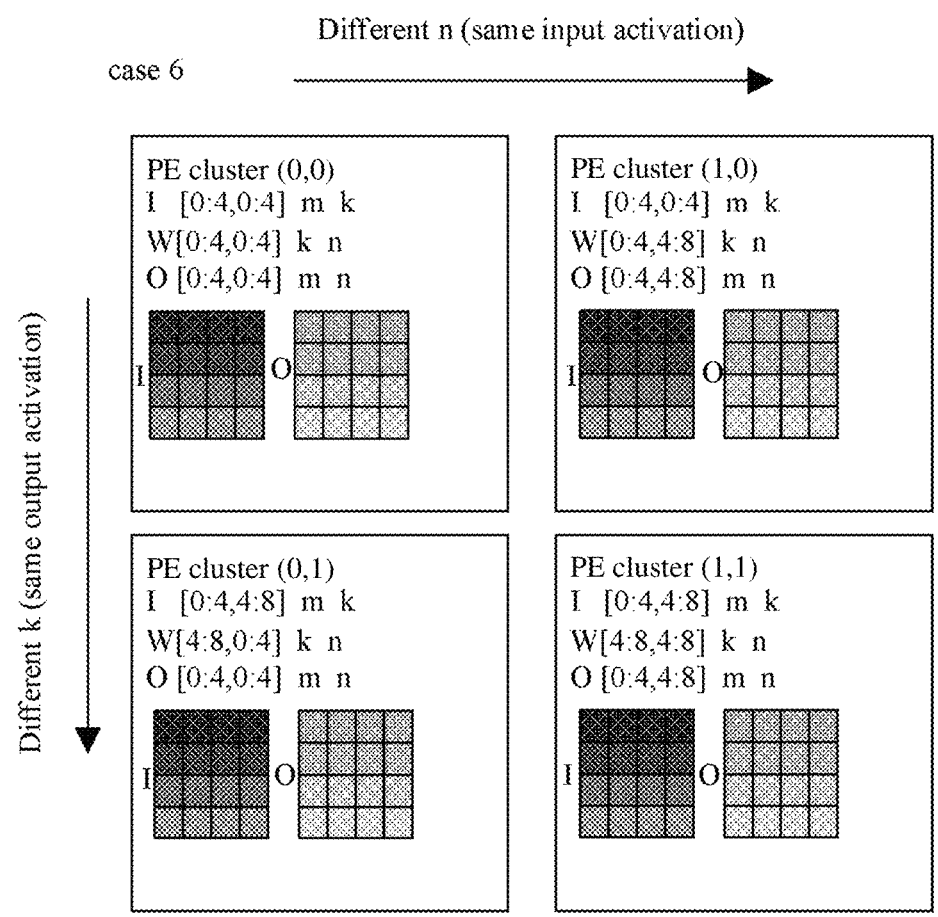

In FIG. 9f, the PE cluster (0, 0) executes a task of multiplying the first four columns (I[0:4,0:4]) of the activation data by the first four rows and the first four columns (that is, W[0:4,0:4]) of the weight data, and an execution result is to output the first four columns (that is, O[0:4,0:4) of the output data. The PE cluster (1, 0) executes a task of multiplying the first four columns (that is, I[0:4,0:4]) of the activation data by the first four rows and the last four columns (that is, W[0:4,4:8]) of the weight data, and an execution result is to output the first four rows and the last four columns (that is, O[0:4,4:8]) of the output matrix. The PE cluster (0, 1) executes a task of multiplying the last four columns (I[0:4,4:8]) of the activation data by the last four rows and the first four columns (that is, W[4:8,4:4]) of the weight data, and an execution result is to output the first four rows and the first four columns (that is, [0:4,0:4]) of the output matrix. The PE cluster (1, 1) executes a task of multiplying the last four columns (that is, I[0:4,4:8]) of the activation data by the last four rows and the last four columns (that is, W[4:8,4:8]) of the weight data, and an execution result is to output the last four columns (that is, O[0:4,4:8]) of the output matrix.

Based on FIG. 9f, corresponding values of the output matrices on the PE cluster (0, 0) and the PE cluster (0, 1) are added to obtain a final value, corresponding values of the output matrices on the PE cluster (1, 0) and the PE cluster (1, 1) are added to obtain a final value, and a finally combined matrix is a final matrix multiplication result.

Figure 9G:
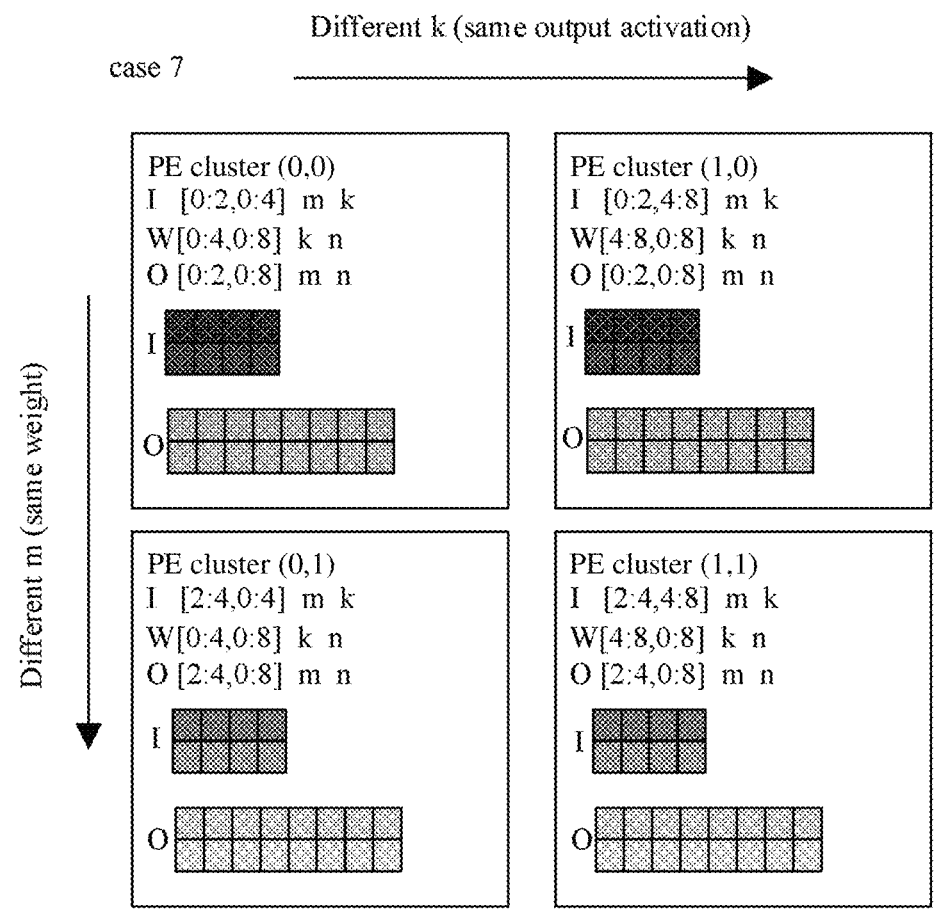

In FIG. 9g, the PE cluster (0, 0) executes a task of multiplying the first two rows and the first four columns (I[0:2,0:4]) of the activation data by the first four rows (that is, W[0:4,0:8]) of the weight data, and an execution result is to output the first two rows (that is, O[0:2,0:8]) of the output data. The PE cluster (1, 0) executes a task of multiplying the first two rows and the last four columns (that is, I[0:2,4:8]) of the activation data by the last four rows (that is, W[4:8, 0:8]) of the weight data, and an execution result is to output the first two rows (that is, O[0:2,0:8]) of the output matrix. The PE cluster (0, 1) executes a task of multiplying the third row and the fourth row and the first four columns (that is, I[2:4,0:4]) of the activation data by the first four columns (that is, W[0:4,0:8]) of the weight data, and an execution result is to output the third row and the fourth row (that is, [2:4,0:8]) of the output matrix. The PE cluster (1, 1) executes a task of multiplying the last two rows and the last four columns (that is, I[2:4,4:8]) of the activation data by the last four rows (that is, W[4:8,0:8]) of the weight data, and an execution result is to output the last two rows (that is, O[2:4,0:8]) of the output matrix.

Based on FIG. 9g, corresponding values of the output matrices on the PE cluster (0, 0) and the PE cluster (1, 0) are added to obtain a final value, corresponding values of the output matrices on the PE cluster (0, 1) and the PE cluster (1, 1) are added to obtain a final value, and a finally combined matrix is a final matrix multiplication result.

In FIG. 9g, the PE cluster (0, 0) executes a task of multiplying the first two rows and the first four columns (I[0:2,0:4]) of the activation data by the first four rows (that is, W[0:4,0:8]) of the weight data, and an execution result is to output the first two rows (that is, O[0:2,0:8) of the output data. The PE cluster (1, 0) executes a task of multiplying the first two rows and the last four columns (that is, I[0:2,4:8]) of the activation data by the last four rows (that is, W[4:8, 0:8]) of the weight data, and an execution result is to output the first two rows (that is, O[0:2,0:8]) of the output matrix. The PE cluster (0, 1) executes a task of multiplying the third row and the fourth row and the first four columns (that is, I[2:4,0:4]) of the activation data by the first four columns (that is, W[0:4,0:8]) of the weight data, and an execution result is to output the third row and the fourth row (that is, [2:4,0:8]) of the output matrix. The PE cluster (1, 1) executes a task of multiplying the last two rows and the last four columns (that is, I[2:4,4:8]) of the activation data by the last four rows (that is, W[4:8,0:8]) of the weight data, and an execution result is to output the last two rows (that is, O[2:4,0:8]) of the output matrix.

Based on FIG. 9g, corresponding values of the output matrices on the PE cluster (0, 0) and the PE cluster (1, 0) are added to obtain a final value, corresponding values of the output matrices on the PE cluster (0, 1) and the PE cluster (1, 1) are added to obtain a final value, and a finally combined matrix is a final matrix multiplication result.

Figure 9H:
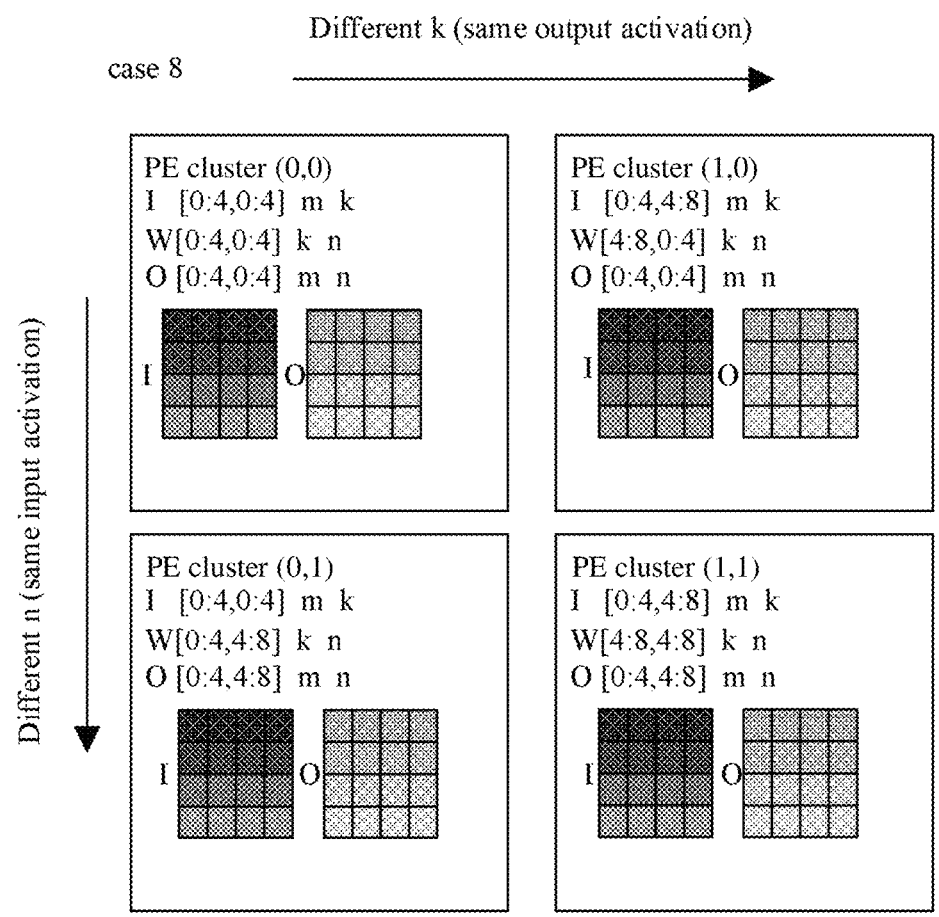

In FIG. 9h, the PE cluster (0, 0) executes a task of multiplying the first four columns (I[0:4,0:4]) of the activation data by the first four rows and the first four columns (that is, W[0:4,0:4]) of the weight data, and an execution result is to output the first four columns (that is, O[0:4,0:4) of the output data. The PE cluster (1, 0) executes a task of multiplying the last four columns (that is, I[0:4,4:8]) of the activation data by the last four rows (that is, W[4:8,0:8]) of the weight data, and an execution result is to output the first four columns (that is, O[0:4,0:4]) of the output matrix. The PE cluster (0, 1) executes a task of multiplying the first four columns (I[0:4,0:4]) of the activation data by the first four rows and the last four columns (that is, W[0:4,4:8]) of the weight data, and an execution result is to output the first four rows and the last four columns (that is, [0:4,4:8]) of the output matrix. The PE cluster (1, 1) executes a task of multiplying the last four columns (that is, I[0:4,4:8]) of the activation data by the last four rows and the last four columns (that is, W[4:8,4:8]) of the weight data, and an execution result is to output the last four columns (that is, O[0:4,4:8]) of the output matrix.

Based on FIG. 9h, corresponding values of the output matrices on the PE cluster (0, 0) and the PE cluster (1, 0) are added to obtain a final value, corresponding values of the output matrices on the PE cluster (0, 1) and the PE cluster (1, 1) are added to obtain a final value, and a finally combined matrix is a final matrix multiplication result.

Figure 9I:
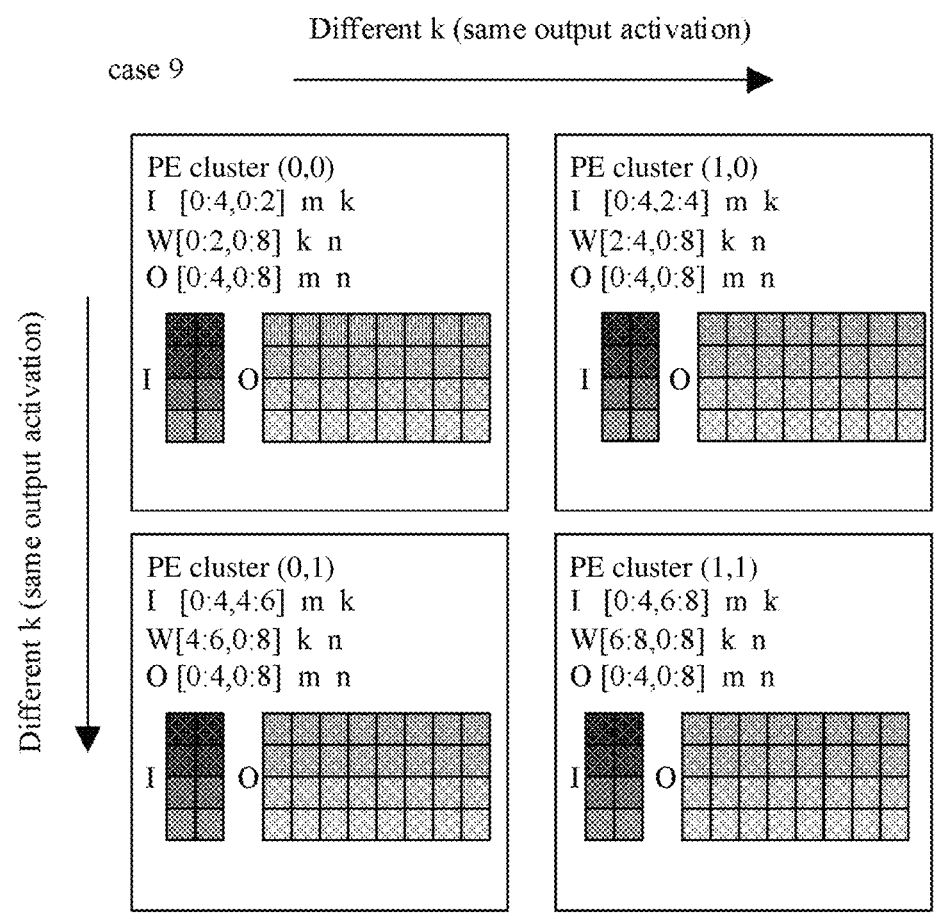

In FIG. 9i, the PE cluster (0, 0) executes a task of multiplying the first two columns (I[0:4,0:2]) of the activation data by the first two rows (that is, W[0:2,0:8]) of the weight data, and an execution result is to output the output data (that is, O[0:4,0:8]). The PE cluster (1, 0) executes a task of multiplying the third column and the fourth column (that is, I[0:4,2:4]) of the activation data by the third row and the fourth row (that is, W[2:4,0:8]) of the weight data, and an execution result is to output the first four rows (that is, O[0:4,0:8]) of the output matrix. The PE cluster (0, 1) executes a task of multiplying the fifth column and the sixth column (I[0:4,4:6]) of the activation data by the fifth row and the sixth row (that is, W[4:6,0:8]) of the weight data, and an execution result is to output the output matrix (that is, [0:4,0:8]). The PE cluster (1, 1) executes a task of multiplying the last two columns (that is, I[0:4,6:8]) of the activation data by the seventh row and the eighth row (that is, W[6:8,0:8]) of the weight data, and an execution result is to output the output matrix (that is, O[0:4,0:8]).

Based on FIG. 9h, corresponding values of the output matrices on the PE cluster (0, 0) to the PE cluster (1, 1) are added to obtain a final matrix multiplication result.

In summary, segmentation along an m direction (row direction of the activation data) means that different PE clusters process the activation data and different row data of the output matrix, but these PE clusters share the same weight data. A quantity of PE clusters involved in the calculation may be determined according to an effective quantity of rows of the activation data. For example, in SPMV (sparse matrix-vector multiplication, sparse matrix-vector multiplication), only one PE cluster is effective (row and column directions of the PE array contain different m).

Segmentation along an n direction (column direction of the weight data) means that different PE clusters calculate various output matrix slices that are segmented in the n direction, and the same input matrix slice is shared between the PE clusters. In this segmentation method, different PE clusters need different weight data. If a degree of multiplexing of the weight data in the calculation is low (smaller m), a data transmission delay will become more severe.

Segmentation along a k direction (row direction of the weight data) means that different PE clusters calculate a partial sum of the same output matrix slice. In this segmentation method, data is not shared between different PE clusters during calculation. In addition, parts generated by different clusters need to be accumulated together to obtain a final result.

According to the acceleration unit provided in this embodiment of the present disclosure, a to-be-executed instruction of a neural network model is decomposed into a plurality of sub-operations that are iteratively performed, operation data of the plurality of sub-operations is obtained by using a direct memory access module, and the plurality of sub-operations are deployed on a PE array for execution. Because the PE array includes three-dimensional PE units, and each PE unit may perform a specified operation, parallel execution by the three-dimensional PE units can implement hardware acceleration of a neural network application.

Further, the decomposing a to-be-executed instruction of a neural network model into a plurality of sub-operations that are iteratively performed for a plurality of times and deploying the plurality of sub-operations on a PE array is: converting an operation of activation data and weight data of a high-dimensional matrix into an operation of activation data and weight data of a low-dimensional matrix that is iteratively performed, and deploying the operation of the activation data and the weight data of the low-dimensional matrix to a PE array, where each PE unit may be configured to perform a one-dimensional matrix multiplication operation, and one-dimensional multiplication operation results may be further accumulated together, which helps implement hardware acceleration of a neural network application.

Further, because the neural network model mainly includes several key neural network applications, such as matrix multiplication, convolution, and depth-wise convolution, these key neural network applications may be converted into an iterative operation of activation data and weight data of a low-dimensional matrix, thereby implementing hardware acceleration of the neural network application, and further implementing hardware acceleration of the neural network model.

Further, although each neural network application may be mapped to an iterative operation of activation data and weight data of a low-dimensional matrix by using a different mapping method, the inventors find that a preferred mapping method may be used for an inherent feature of each neural network application. Compared with a remaining mapping method, data movement between an external memory and the PE array can be reduced by using the preferred mapping method. For example, for matrix multiplication, a preferred mapping method is an input stationary mapping method.

Commercial Value of Embodiments of the Present Disclosure

The embodiments of the present disclosure provide an instruction set architecture for a new concept of a neural network application, so as to be applied to an acceleration unit of a neural network model. This acceleration unit is currently widely used. That is, the acceleration unit provided in the embodiments of the present disclosure has a realistic application scenario, and therefore has a market prospect and commercial value.

A person skilled in the art can understand that the present disclosure may be implemented as a system, a method, and a computer program product. Therefore, the present disclosure may be, for example, implemented in the following forms: complete hardware, complete software (including firmware, resident software, and microcode), or may be implemented in a form of a combination of software and hardware. In addition, in some embodiments, the present disclosure may further be implemented in a form of a computer program product in one or more computer readable media that include computer readable program code.

Any combination of one or more computer readable media may be used. The computer-readable medium may be a computer-readable signal medium or a computer-readable storage medium. The computer readable storage medium is, for example, but is not limited to, an electrical, magnetic, optical, electromagnetic, infrared, or semiconductor system, apparatus, or device, or any other combination thereof. A more specific example of the computer readable storage medium includes a specific electrical connection of one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination thereof. In this specification, the computer readable storage medium may be any tangible medium that includes or stores a program, and the program may be used by or in combination with a processing unit, an apparatus, or a device.

The computer readable signal medium may be included in a baseband or a data signal propagated as a portion of a clipped wave, and carries computer readable program code. The data signal propagated in such manner may be in a plurality of forms, including but not limited to an electromagnetic signal, an optical signal, or any other suitable combination. The computer readable signal medium may further be any computer readable medium other than a computer readable storage medium, and the computer readable medium may send, propagate, or transmit a program used by or in combination with an instruction system, apparatus, or device.

The program code included in the computer readable medium may be transmitted in any suitable medium, including but not limited to wireless, wire, optical cable, RF, and any suitable combination thereof.

Computer program code for executing the embodiments of the present disclosure may be compiled in one or more programming languages or combinations. The programming languages include an object-oriented programming language, for example, JAVA and C++, and may further include a conventional procedural programming language, for example, C. The program code may be completely executed on a user computer, or may be partially executed on a user computer as a standalone software package, or may be partially executed on a user computer and partially executed on a remote computer, or may be completely executed on a remote computer or a server. In cases involving the remote computer, the remote computer may be connected to a user computer through any type of network, including a local area network (LAN) or a wide area network (WAN), or may be connected to an external computer (for example, via the Internet using an Internet service provider).

The foregoing descriptions are exemplary embodiments of the present disclosure but are not intended to limit the present disclosure. The present disclosure may include various modifications and changes for a person skilled in the art. Any modification, equivalent replacement, or improvement and the like made within the spirit and principle of the present disclosure shall fall within the protection scope of the present disclosure.

What is claimed is:

1. An instruction processing apparatus, comprising:
a plurality of instruction buffers,
a plurality of hardware registers,
a selector,
a parser, and
an operation circuit,
wherein:
the selector is configured to:
 receive a command and data,
 parse out a command type and a buffer identifier from the received command,
 determine whether the command type is a configuration type or an execution type,
 in response to the command type being the configuration type, send the received data and the buffer identifier to the parser, and
 in response to the command type being the execution type, send the buffer identifier to the operation circuit;
the parser is configured to:
 parse out an instruction sequence from the received data, store the instruction sequence into one of the plurality of instruction buffers that corresponds to the buffer identifier, and store an operand of each instruction of the instruction sequence into a corresponding entry of the plurality of hardware registers; and the operation circuit is configured to:

sequentially execute instructions of the instruction sequence stored in the instruction buffer corresponding to the buffer identifier, generate a control signal for each executed instruction, and send the control signal of each executed instruction and the operand of the executed instruction stored in the plurality of hardware registers to a plurality of execution units, for each of the plurality of execution units to perform a corresponding operation based on the received control signal and the operand.

2. The instruction processing apparatus according to claim 1, wherein the parser is further configured to:

parse an original operand of each instruction of the instruction sequence; and convert the original operand into the operand for executing the instruction on each execution unit.

3. The instruction processing apparatus according to claim 1, wherein the instruction processing apparatuses further comprises a scalar calculation unit, configured to:

receive intermedia calculation results from the plurality of execution units that have executed an instruction of the instruction sequence;

calculate a new operand for the instruction; and update the operand of the instruction stored in a corresponding entry in the plurality of hardware registers with the new operand.

4. The instruction processing apparatus according to claim 1, wherein the instruction processing apparatus supports a plurality of predefined instructions, and the instruction sequence comprises one or more of the plurality of predefined instructions.

5. The instruction processing apparatus according to claim 4, wherein the plurality of predefined instructions comprise a data loading instruction, and each of the plurality of execution units obtains a first vector and a second vector according to a control signal of the data loading instruction, and stores the first vector and the second vector into a first queue and a first buffer, wherein the first queue is configured to store weight data of a neural network, and the first buffer is configured to store activation data of the neural network.

6. The instruction processing apparatus according to claim 4, wherein the plurality of predefined instructions comprise a multiplication accumulation instruction, and each of the plurality of execution units obtains two values from a first queue and a first buffer according to a control signal of the multiplication accumulation instruction, so as to perform a multiplication accumulation operation, wherein the first queue is configured to store weight data of a neural network, and the first buffer is configured to store activation data of the neural network.

7. The instruction processing apparatus according to claim 6, comprising a scalar calculation unit, which is further configured to:

store a queue state in the corresponding entry of the plurality of hardware registers, wherein the queue state specifies an attribute of the first queue, and the attribute of the first queue is one of the following: a first-in-first-out queue, a rotation queue, and a sliding window queue.

8. The instruction processing apparatus according to claim 4, wherein the plurality of predefined instructions comprise a data storage instruction, and each of the plurality of execution units stores, into an external memory, an intermediate calculation result generated by the plurality of execution units according to a control signal of the data storage instruction.

9. The instruction processing apparatus according to claim 4, wherein the plurality of predefined instructions comprise a special function instruction, and each of the plurality of execution units starts a corresponding special functional unit according to a control signal of the special function instruction.

10. The instruction processing apparatus according to claim 1, wherein the instruction sequence corresponds to a specified neural network application, and the operation circuit uses different instruction sequences for different neural network applications.

11. The instruction processing apparatus according to claim 10, wherein the specified neural network application is one of the following applications: matrix multiplication, convolution, and depth-wise convolution.

12. The instruction processing apparatus according to claim 10, wherein:

when processing an instruction sequence of matrix multiplication, the operation circuit uses two levels of instruction pipelines: an instruction decoding level and an operand fetching level; and when processing convolution or depth-wise convolution, the operation circuit uses four levels of instruction pipelines: an instruction decoding level, an operand fetching level, a scalar processing level, and a write-back level.

13. A computer-implemented method, comprising:

receiving, by a selector, a command and data for a neural network computation;

parsing out, by the selector, a command type and a buffer identifier from the received command;

determining, by the selector, whether the command type is a configuration type or an execution type;

in response to the command type being the configuration type, sending, by the selector, the received data and the buffer identifier to a parser;

in response to the command type being the execution type, sending, by the selector, the buffer identifier to an operation circuit;

parsing out, by the parser, an instruction sequence from the received data;

storing, by the parser, the instruction sequence into one of a plurality of instruction buffers that corresponds to the buffer identifier;

storing, by the parser, an operand of each instruction of the instruction sequence into a corresponding entry of a plurality of hardware registers;

sequentially executing, by an operation circuit, instructions of the instruction sequence stored in the instruction buffer corresponding to the buffer identifier;

generating, by the operation circuit, a control signal for each executed instruction; and sending, by the operation circuit, the control signal of each executed instruction and the operand of the executed instruction stored in the plurality of hardware registers to a plurality of execution units, for each of the plurality of execution units to perform a corresponding operation based on the received control signal and the operand.

14. The computer-implemented method of claim 13, further comprising:
   parsing, by the parser, an original operand of each instruction of the instruction sequence; and
   converting, by the parser, the original operand into the operand for executing the instruction on each execution unit.

15. The computer-implemented method of claim 13, further comprising:
   receiving, by the operation circuit, intermedia calculation results from the plurality of execution units that have executed an instruction of the instruction sequence;
   calculating, by the operation circuit, a new operand for the instruction; and
   updating, by the operation circuit, the operand of the instruction stored in a corresponding entry in the plurality of hardware registers with the new operand.

16. The computer-implemented method of claim 13, wherein the instruction sequence comprises one or more of a plurality of predefined instructions.

17. The computer-implemented method of claim 16, wherein the instruction sequence comprises a data loading instruction, and the method further comprises:
   obtaining, by each of the plurality of execution units, a first vector and a second vector according to a control signal of the data loading instruction, and
   storing, by each of the plurality of execution units, the first vector and the second vector into a first queue and a first buffer, wherein the first queue is configured to store weight data of a neural network, and the first buffer is configured to store activation data of the neural network.

18. The computer-implemented method of claim 16, wherein the instruction sequence comprises a multiplication accumulation instruction, and the method further comprises:
   obtaining, by each of the plurality of execution units, two values from a first queue and a first buffer according to a control signal of the multiplication accumulation instruction to perform a multiplication accumulation operation, wherein the first queue is configured to store weight data of a neural network, and the first buffer is configured to store activation data of the neural network.

19. The computer-implemented method of claim 13, wherein the instruction sequence corresponds to a specified neural network application, and the operation circuit uses different instruction sequences for different neural network applications.

20. The computer-implemented method of claim 13, wherein each of the plurality of execution units a plurality of processing entities comprises:
   a weight queue configured to store weight data of a neural network;
   an input buffer configured to store activation data of the neural network;
   a load queue configured to store to-be-executed computation payloads based on the weight data from the weight queue and the activation data from the input buffer;
   a load balancer coupled to the load queue of the processing entity and a load queue of a neighboring processing entity, and
   the method further comprising:
      detecting, by the load balancer, a load imbalance between the load queue of the processing entity and a load queue of the neighboring processing entity; and
      if the load queue of the processing entity has a heavier load, fetching, by the load balancer, a payload from the load queue of the processing entity and send the payload to the load queue of the neighboring processing entity for processing.

* * * * *